United States Patent
Nagahama

(10) Patent No.: US 9,094,725 B2
(45) Date of Patent: Jul. 28, 2015

(54) SYSTEM, METHOD FOR PROCESSING ASSOCIATED DATA OF BROADCASTING PROGRAM AND E-MAIL SET, AND INFORMATION STORAGE MEDIUM

(71) Applicant: Kabushiki Kaisha Toshiba, Minato-ku, Tokyo (JP)

(72) Inventor: Kentaro Nagahama, Tachikawa (JP)

(73) Assignee: KABUSHIKI KAISHA TOSHIBA (JP)

( * ) Notice: Subject to any disclaimer, the term of this patent is extended or adjusted under 35 U.S.C. 154(b) by 0 days.

(21) Appl. No.: 14/306,045

(22) Filed: Jun. 16, 2014

(65) Prior Publication Data

US 2015/0095945 A1 Apr. 2, 2015

(30) Foreign Application Priority Data

Sep. 27, 2013 (JP) ................. 2013-201427

(51) Int. Cl.
- *H04N 21/4786* (2011.01)
- *G06Q 30/02* (2012.01)
- *G06Q 30/06* (2012.01)
- *H04N 21/478* (2011.01)
- *H04N 21/258* (2011.01)
- *H04N 21/442* (2011.01)
- *H04N 21/45* (2011.01)
- *H04N 21/81* (2011.01)
- *H04N 21/4784* (2011.01)

(52) U.S. Cl.
CPC ....... *H04N 21/4786* (2013.01); *G06Q 30/0201* (2013.01); *G06Q 30/0601* (2013.01); *H04N 21/25891* (2013.01); *H04N 21/44204* (2013.01); *H04N 21/44222* (2013.01); *H04N 21/4532* (2013.01); *H04N 21/478* (2013.01); *H04N 21/4784* (2013.01); *H04N 21/812* (2013.01); *G06Q 30/0207* (2013.01); *G06Q 30/0241* (2013.01)

(58) Field of Classification Search
CPC . H04N 21/812; H04N 21/6582; H04N 7/165; H04N 21/44222; H04N 21/2407; H04N 21/44204
USPC .................. 725/14, 22, 32–36, 133, 141, 153
See application file for complete search history.

(56) References Cited

U.S. PATENT DOCUMENTS

| | | | |
|---|---|---|---|
| 2011/0138326 A1 | 6/2011 | Roberts et al. | |
| 2011/0306368 A1 | 12/2011 | McCarthy | |
| 2012/0240144 A1* | 9/2012 | Rose | 725/14 |
| 2013/0227013 A1 | 8/2013 | Maskatia et al. | |

FOREIGN PATENT DOCUMENTS

| | | |
|---|---|---|
| JP | 2002-111610 A | 4/2002 |
| JP | 2003-284041 A | 10/2003 |

(Continued)

OTHER PUBLICATIONS

Extended European Search Report in European Patent Application No. 14171833.8 dated Feb. 9, 2015 in 7 pages.

*Primary Examiner* — Oleg Asanbayev
(74) *Attorney, Agent, or Firm* — Knobbe Martens Olson & Bear LLP

(57) ABSTRACT

According to one embodiment, a receiver receives first data that enables recognition that a first program has been viewed in a first television set. And a transmitter transmits a message, using the first data, the message is addressed to a first device registered in association with the first television set and includes information relating to the first program.

9 Claims, 34 Drawing Sheets

(56) References Cited

FOREIGN PATENT DOCUMENTS

| | | | |
|---|---|---|---|
| JP | 2010-050549 A | 3/2010 | |
| JP | 4980371 B2 | 7/2012 | |
| WO | WO 2008/081595 A1 | 7/2008 | |
| WO | WO2008/081595 A1 | 7/2008 | |

* cited by examiner

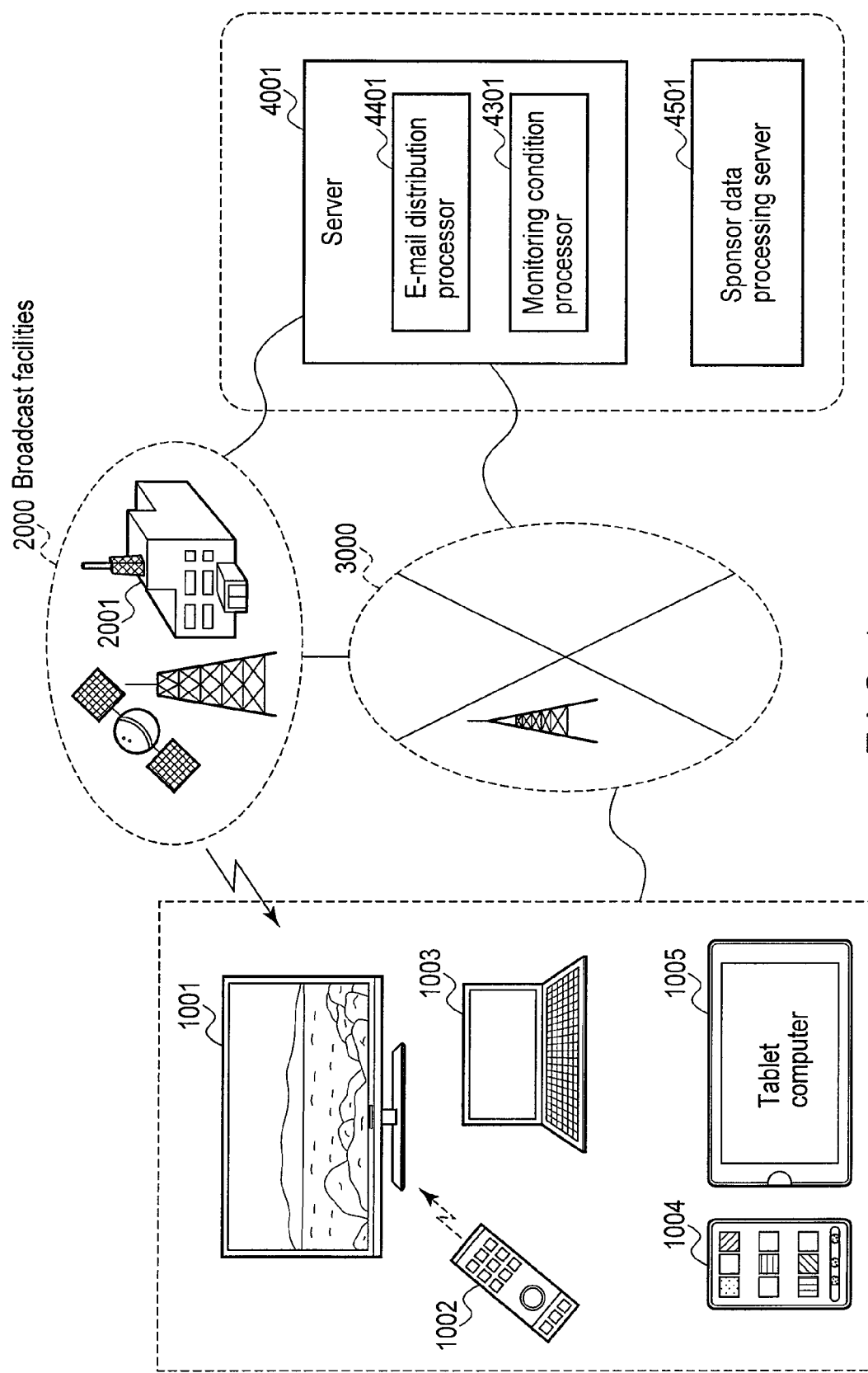
F I G. 1

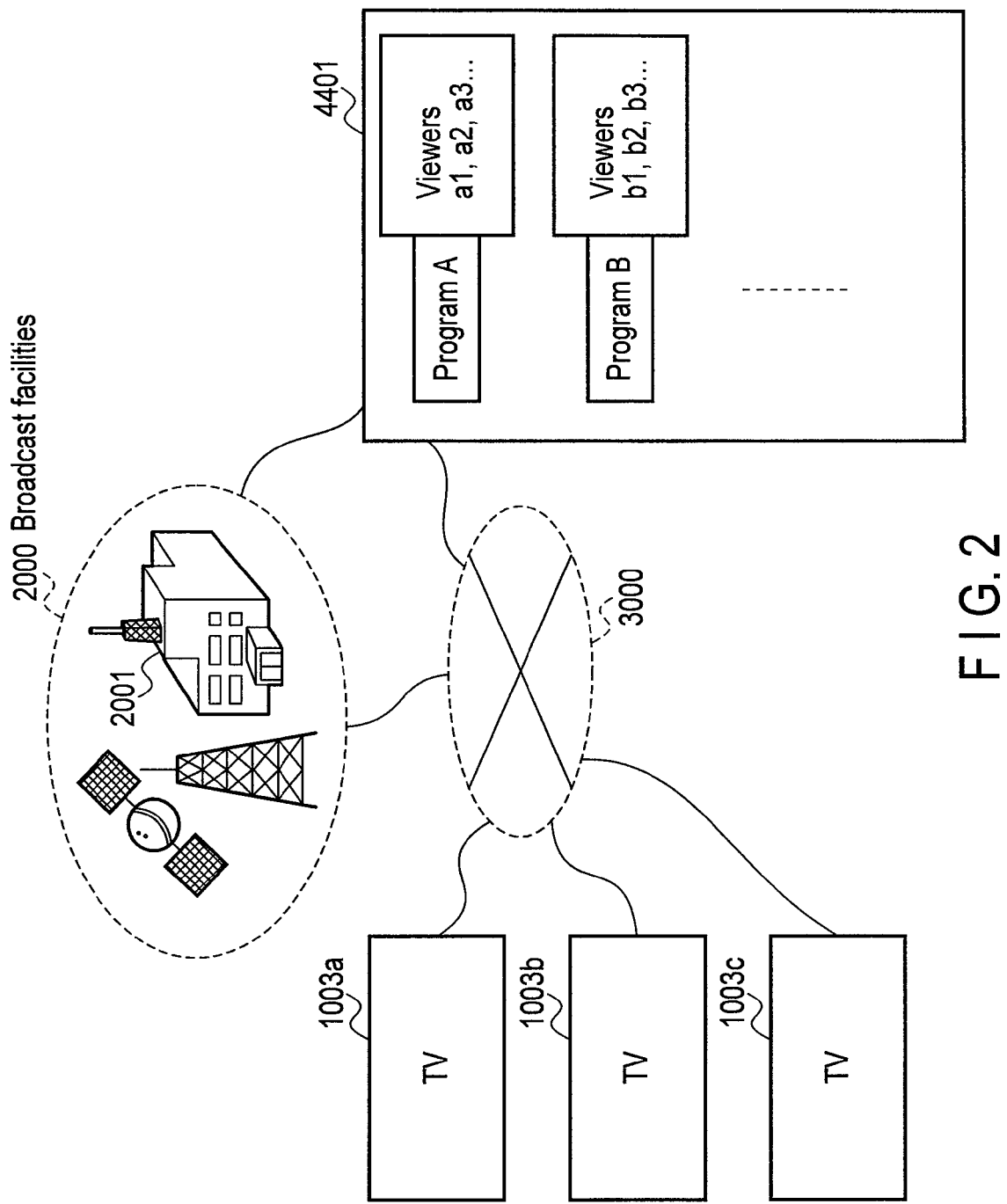
F I G. 2

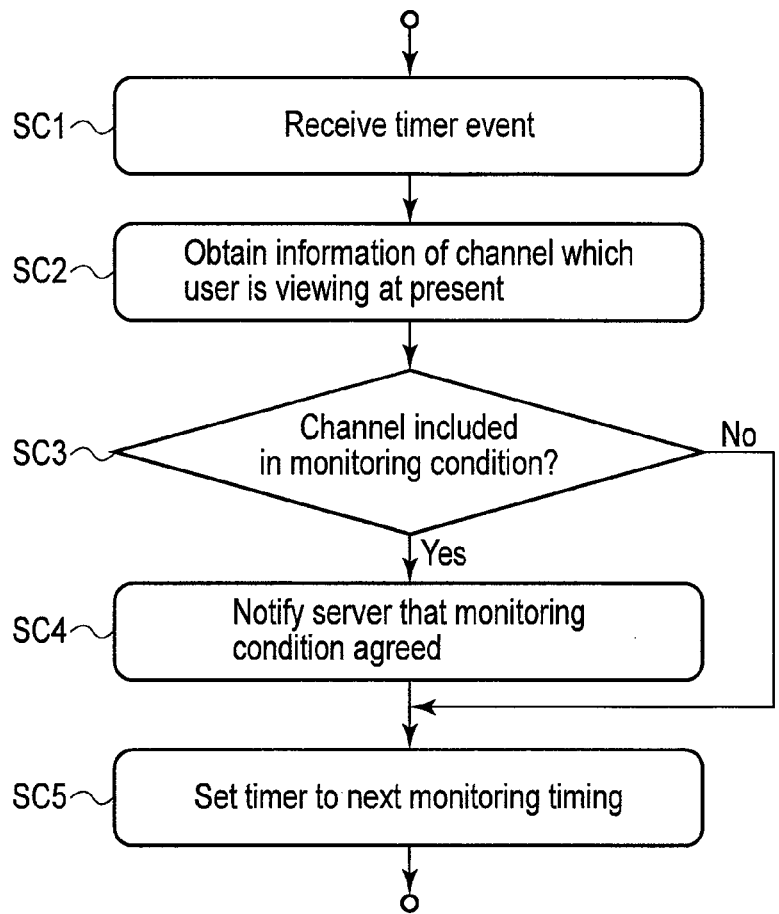
F I G. 6
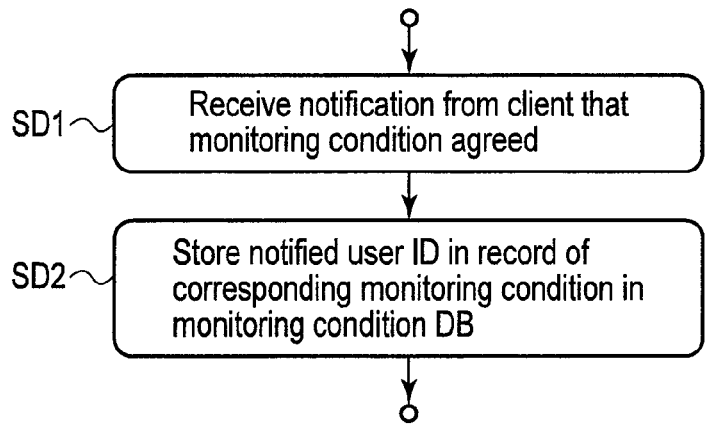
F I G. 7

| Request ID | Title | Text | Monitoring start time | Monitoring end time | Monitored channel | User condition (gender) | User condition (generation) | User condition (Prefecture) |
|---|---|---|---|---|---|---|---|---|
| 1 | XX questionnaires | ... | 2013/08/20 12:00:00 | 2013/08/20 12:30:00 | Channel A | | | |
| 2 | Advertisement 1 | ... | 2013/08/20 17:00:00 | 2013/08/20 18:00:00 | Channel B Channel C | Male | | Tokyo, Kanagawa |
| 3 | Advertisement 2 | ... | 2013/08/21 19:00:00 | 2013/08/21 19:20:00 | Channel D | | Twenties, Thirties | Tokyo |

F I G. 9

| Monitoring ID | Monitoring time | Monitored Channel | Viewing user ID |
|---|---|---|---|
| 1 | 2013/08/20 12:00:00 | Channel A | 00001<br>00002<br>00003 |
| 2 | 2013/08/20 12:10:00 | Channel A | |
| 3 | 2013/08/20 12:20:00 | Channel A | 00001<br>00002<br>00004 |
| 4 | 2013/08/20 12:30:00 | Channel A | 00005 |
| 5 | 2013/08/20 18:00:00 | Channel B<br>Channel C | 00001<br>00002<br>00004 |
| 6 | 2013/08/20 18:10:00 | Channel B<br>Channel C | 00001<br>00002<br>00004 |
| 7 | 2013/08/20 18:20:00 | Channel B<br>Channel C | |

FIG. 10

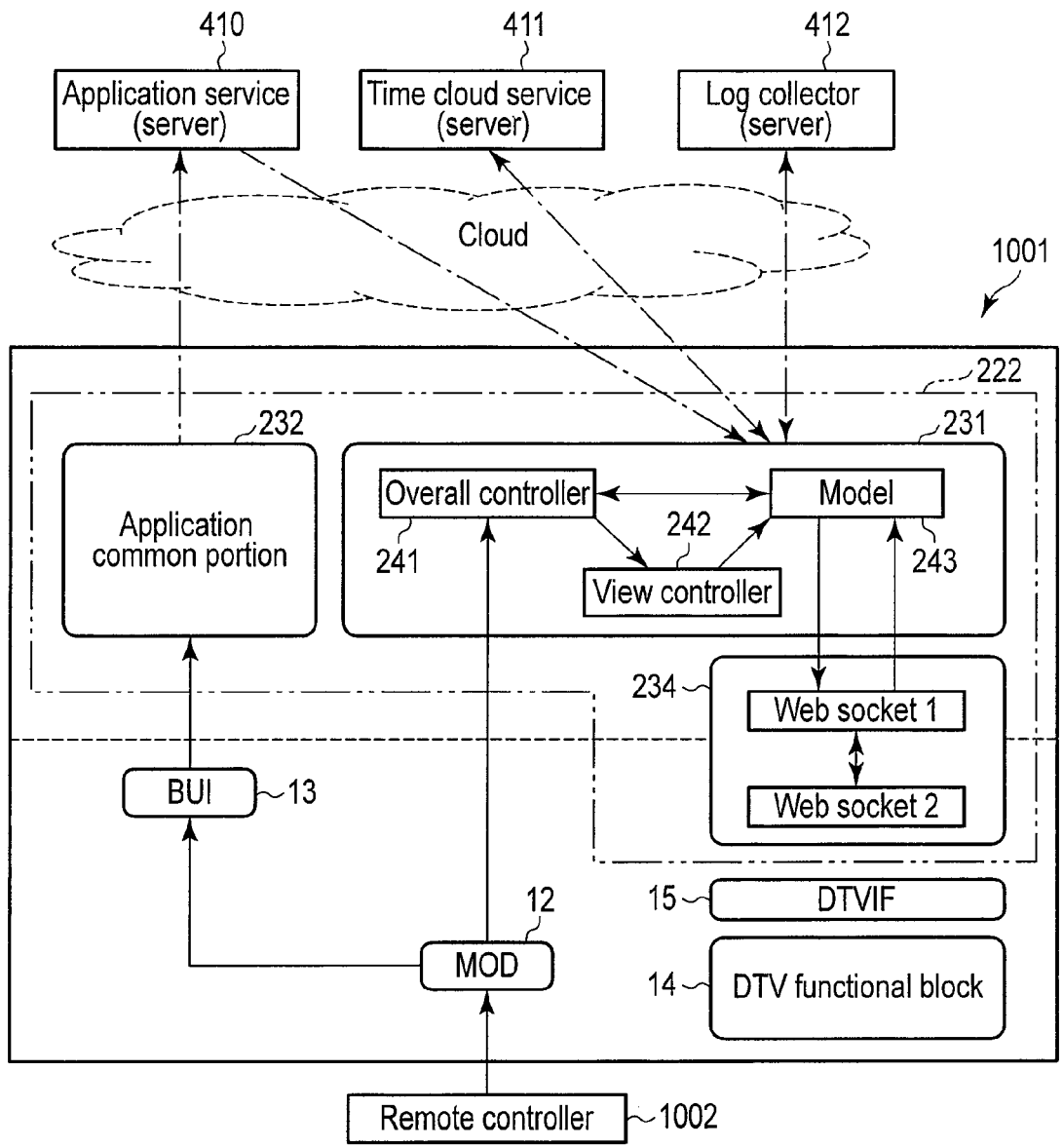
F I G. 14

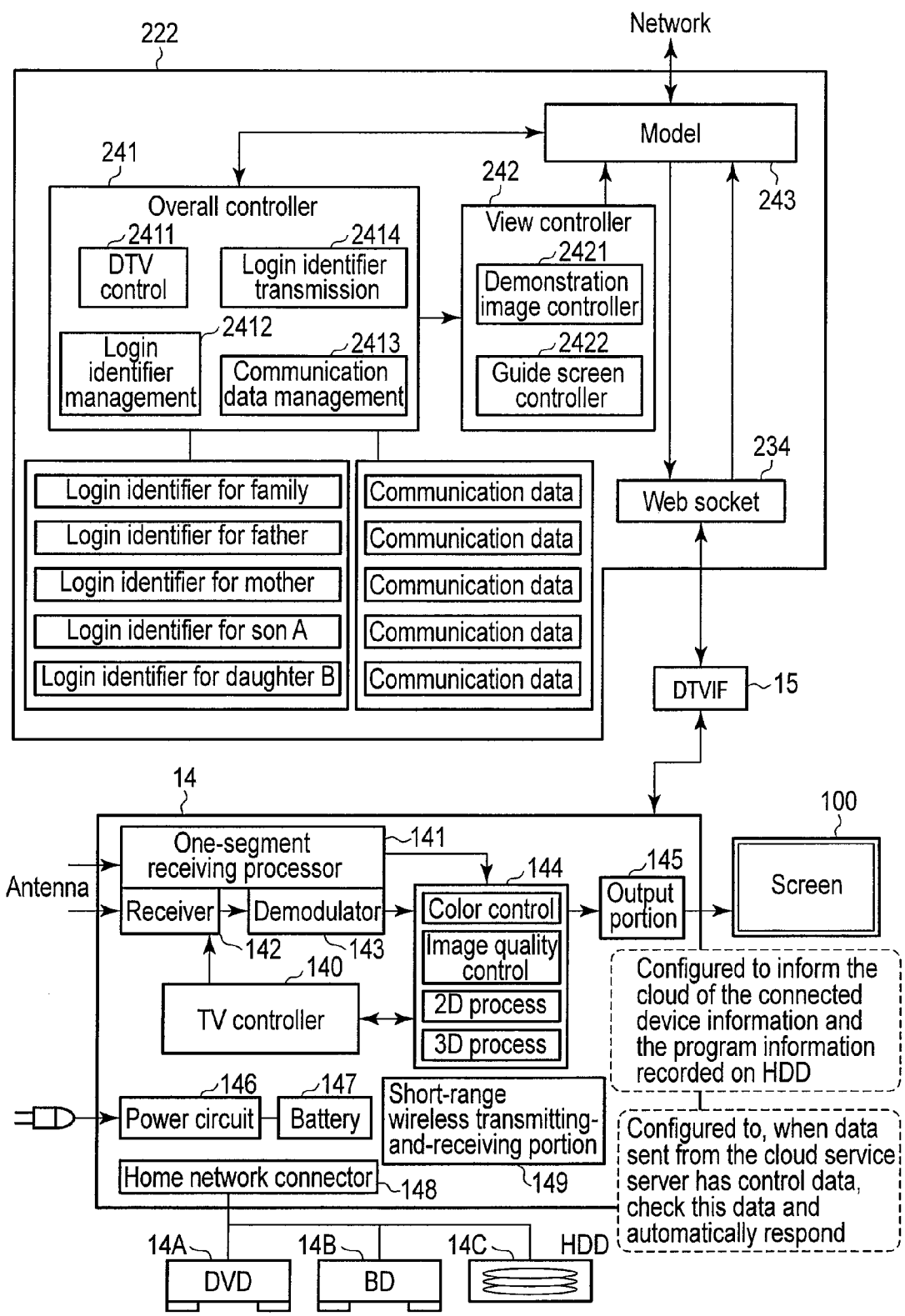
F I G. 15

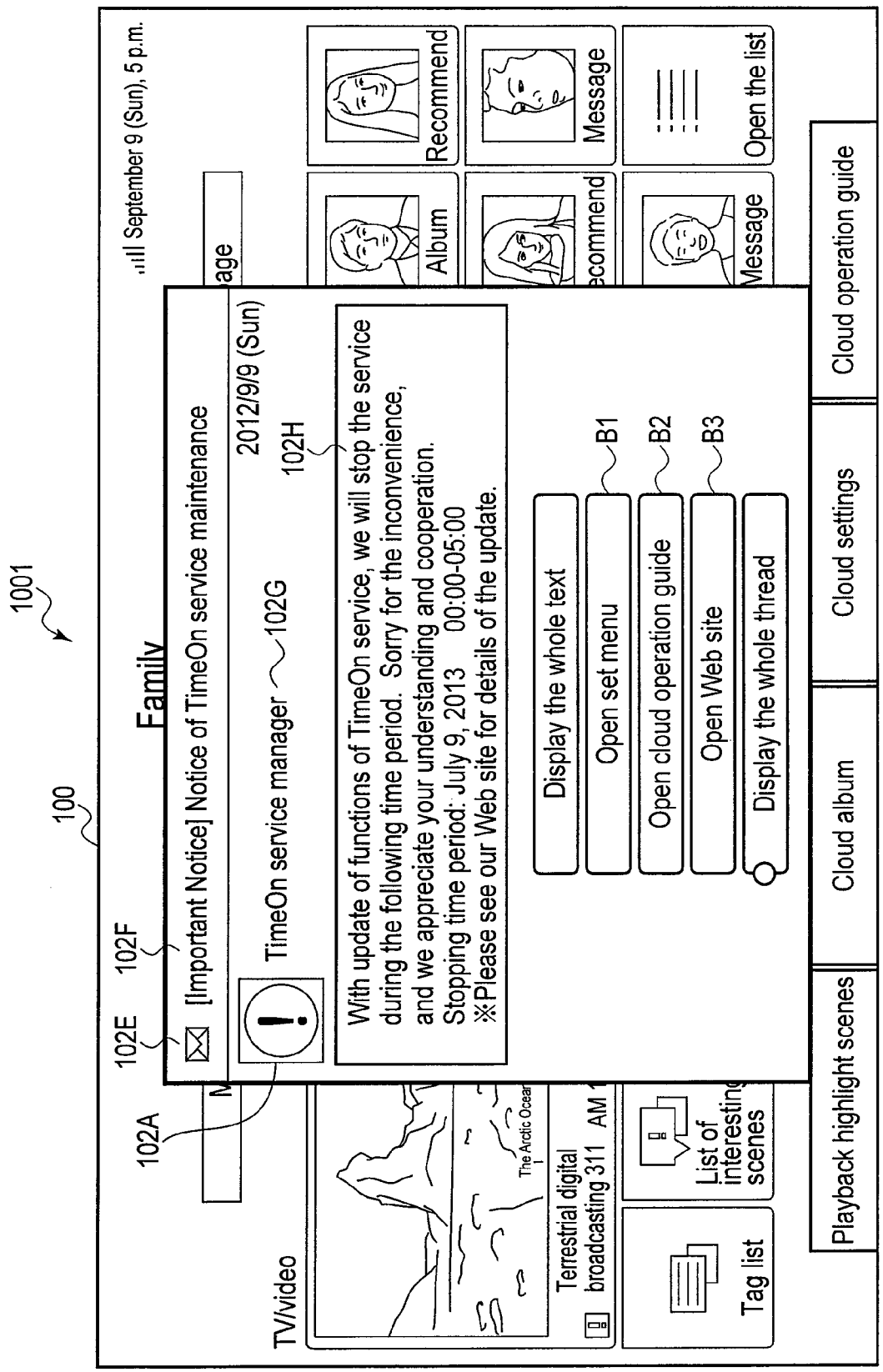
F I G. 17

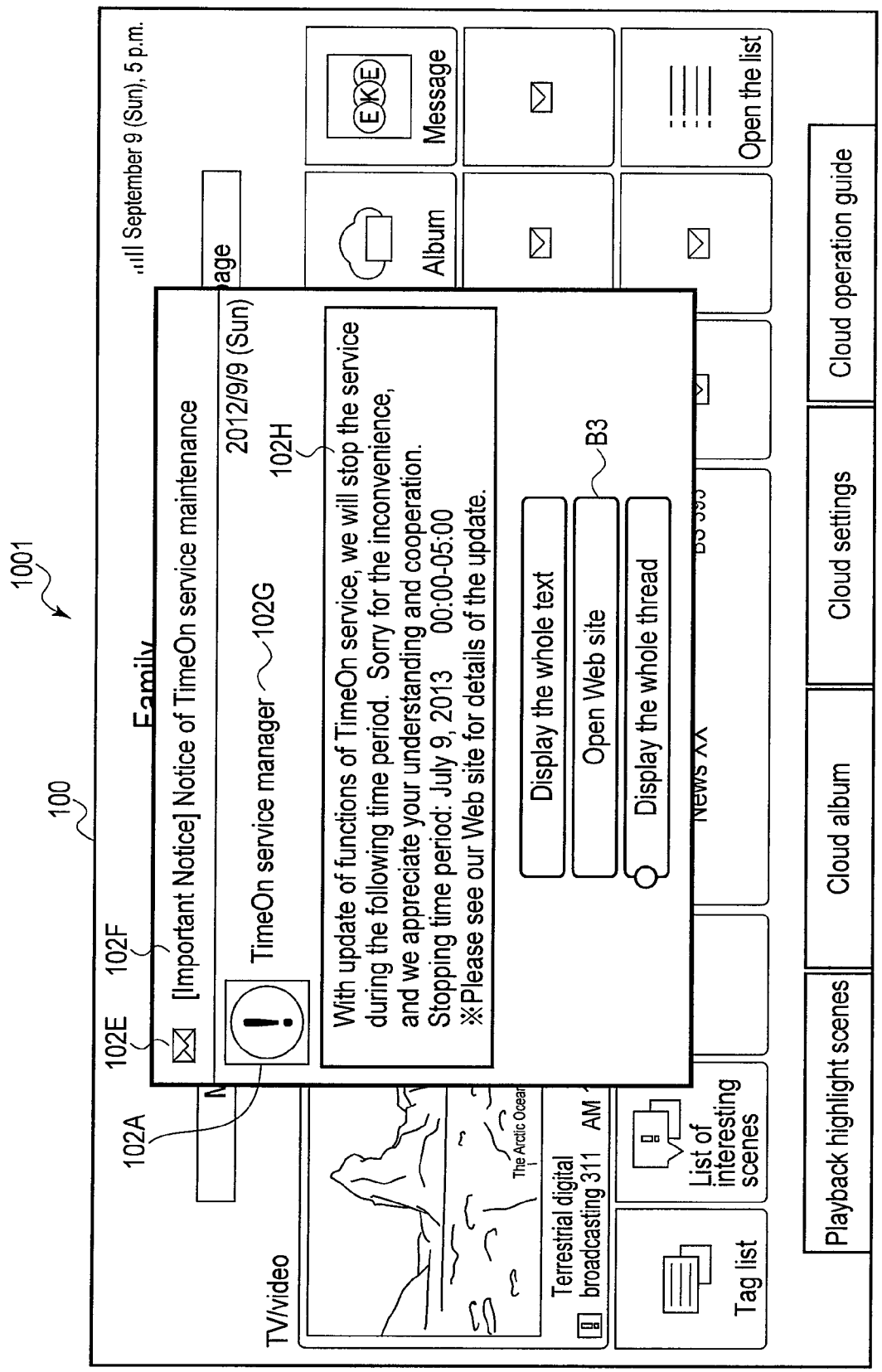
F I G. 18

>> System Announcement | Devices | Targered Announcement | Administration ✕

System Announcement
　　　　　　　　　　　　　　　　　　　Marketing Announcement

Filter by
1-1

| | 8-8 | 9-9 | | | | | | | 10-10 | | |
|---|---|---|---|---|---|---|---|---|---|---|---|
| | Created Date ▶ | 2013-07-27 | | | | | | | Create a new message | | |
| | 2-2 | | 3-3 | | 4-4 | | 5-5 | | 6-6 | 7-7 | |
| System Message ID | Long Title | | Message Type | | Created Data | | Sender | | | | |
| 201307270001 | [Important] Server Maintenance ... | | Important | | 2013-07-27 | | TAS manager | | ✏ | ✕ | |
| 201307270002 | [Info] TimeOn was updated ! | | Normal | | 2013-07-27 | | TAS manager | | ✏ | ✕ | |
| 201307270003 | [Ad] XXXXXX ... | | Advertisement | | 2013-07-27 | | TAS As | | ✏ | ✕ | |

| Services Pages & Promotions | Avaitalelility Massagement | Devices | Forum Message | Administration |

>> System Announcement > Create a message (1) System Message ID : 201307270001

Message Parameters (2) Message Type: [Im portant ▼]

(3) Short Title: [Im portant]

(4) Long Title: [[Im portant]]

(5) Main Text:

(6) Sub Text:

(7) Notified Date (UTC): 201307382300

Message Date (8) Menu : [Cloud Setting Top ▶]

(9) Guide : [Message > Message Service ▶]

(10) url_tv : http://tv.sample.com

(11) url : http://sample.com

YYYYMMDDhhmm

F I G. 24

5001

Recipients

(12) Recipient Type [Users in some conditions ▼]

(13) Device-id / User-id [　　　] [Clear] [add]

Filter by
Filtering rules for users :

(14) ☐ Gender  ☑ Male  ☑ Female

(15) ☑ Generation  ☐ Under 19  ☐ 20s  ☑ 30s  ☑ 40s
             ☐ 50s  ☐ Over 60

(16) ☐ Birth Month  ☑ Jan ☑ Feb ☑ Mar ☑ Apr ☑ May ☑ Jun
                ☑ jul ☑ Aug ☑ Sep ☑ Oct ☑ Nov ☑ Dec Filtering rules for Devices :

(17) ☐ Prefecture  ☑ Hokkaido  ☑ Aomori    ☑ Iwate      ☑ Miyagi     ☑ Akita
                ☑ Yamagata  ☑ Fukushima ☑ Ibaraki    ☑ Tochigi    ☑ Gunma
                ☑ Saitama   ☑ Chiba     ☑ Tokyo      ☑ Kanagawa   ☑ Niigata
                ☑ Yamanashi ☑ Nagano    ☑ Toyama     ☑ Ishikawa   ☑ Fukui
                ☑ Shizuoka  ☑ Aichi     ☑ Mie        ☑ Gifu       ☑ Shiga
                ☑ Kyoto     ☑ Osaka     ☑ Hyogo      ☑ Nara       ☑ Wakayama
                ☑ Tottori   ☑ Shimane   ☑ Okayama    ☑ Hiroshima  ☑ Yamaguchi
                ☑ Tokushima ☑ Kagawa    ☑ Ehime      ☑ Kochi      ☑ Fukuoka
                ☑ Saga      ☑ Nagasaki  ☑ Kumamoto   ☑ Ooita      ☑ Miyazaki
                ☑ Kagoshima ☑ Okinawa

F I G. 25

~5001

Sender Info
(18) Sender Name : XXXXX Official
(19) Sender Thumb :

Management Info
(20) Comment  [ This field is used for creator's memo.
                It is not included in the created message. ]

(21) Status : Unsent
(22) The number of recipients :
(23) The number of read recipients :
(24) The number of unread recipients :

(25) ☑ Please check if this message has been authorized.

Test User ID                                    Test User ID

[ Save ]   [ Cancel ]   [ Send ]      [ Test ]   [        ]
 (26)       (27)         (28)          (29)        (30)

>> Marketing Announcement

Filter by 1-1  6-6  7-7
Created Date ▼   2013-07-27
2-2  3-3
Subject   Created Data 8-8
Create a new message 4-4  5-5
☐ ☒
☐ ☒
☐ ☒

| Marketing Message ID | Subject | Created Data |
|---|---|---|
| 201307270001 | [Important] Server Maintenance ... | 2013-07-27 |
| 201307270002 | [Info] TimeOn was updated ! | 2013-07-27 |
| 201307270003 | [Ad] XXXXXX ... | 2013-07-27 |

✕

Marketing Announcement Create a message (1) Marketing Message ID : 201307270001

Message Parameters (2) Message Type — E-mail ▶

(3) Subject — [Important]

(4) Main Text (5) Notified Date (UTC) — 201307382300    YYYYMMDDhhmm

FIG. 28

Recipients (6) Recipient Type — Users who viewed some specific programs ▶

(7) User-id — [ ]   [Clear]

[add]

Targeting Rules (8) Targeting Method — Program's Airing Time and Channel code ▶

(9)
(10) Monitoring start time — YYYYMMDDhhmmss
(11) Monitoring end time — YYYYMMDDhhmmss
(12) Broadcasting Channels — [Select items]
(13) BS Channels — [Select items]
(14) BS Channels — [Select items]

(15) [add]

Sender Info

(16) Sender E-mail : xxx@ sample.com

Management Info

(17) Comment — This field is used for creator's memo.
It is not included in the created message.

(18) Status : Unsent

(19) ☑ Please check if this message has been authorized.

| Save | Cancel | Send | Test | Test E-mail |
| (20) | (21) | (22) | (23) | (24) |

F I G. 30

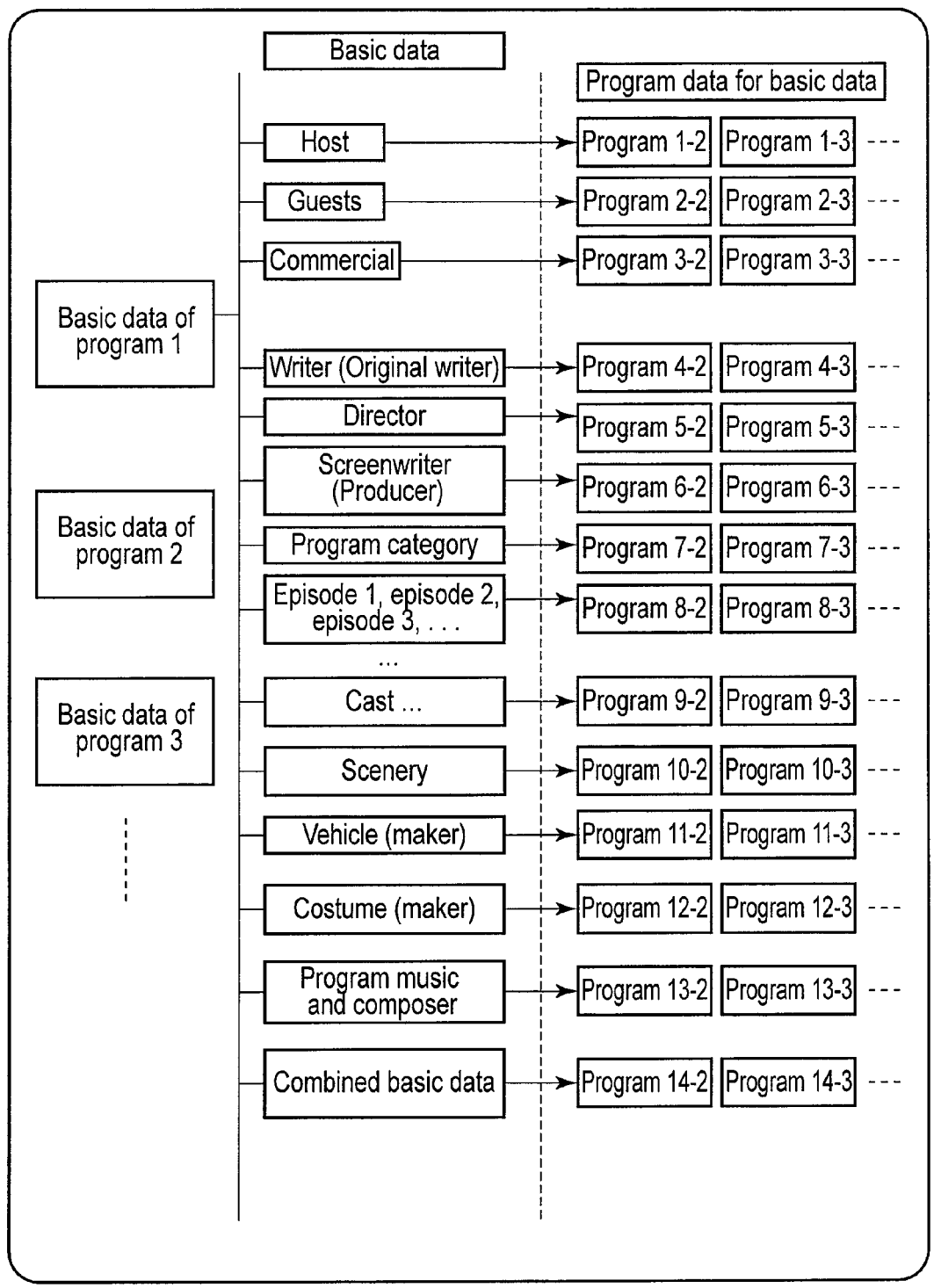
F I G. 32

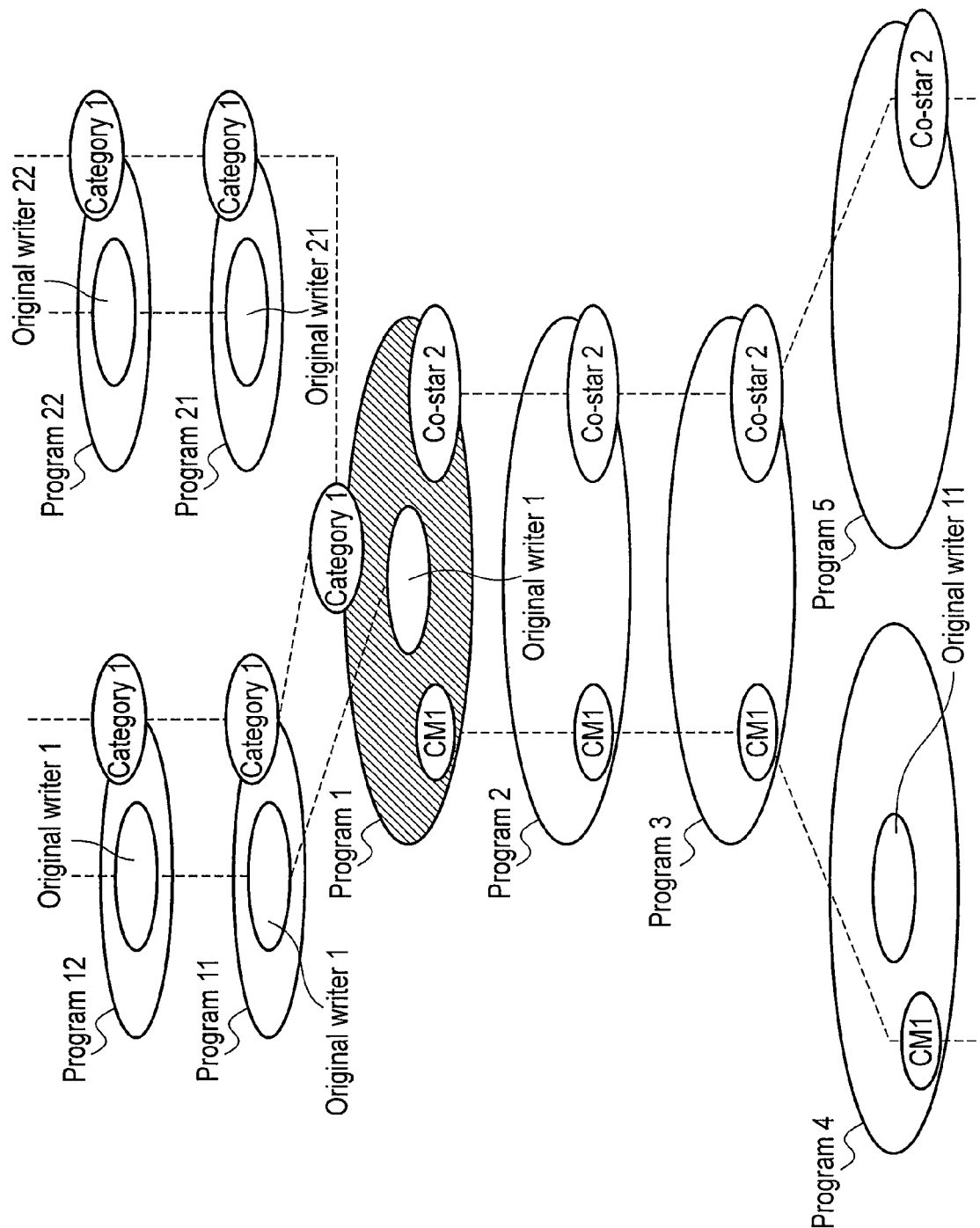
F I G. 34

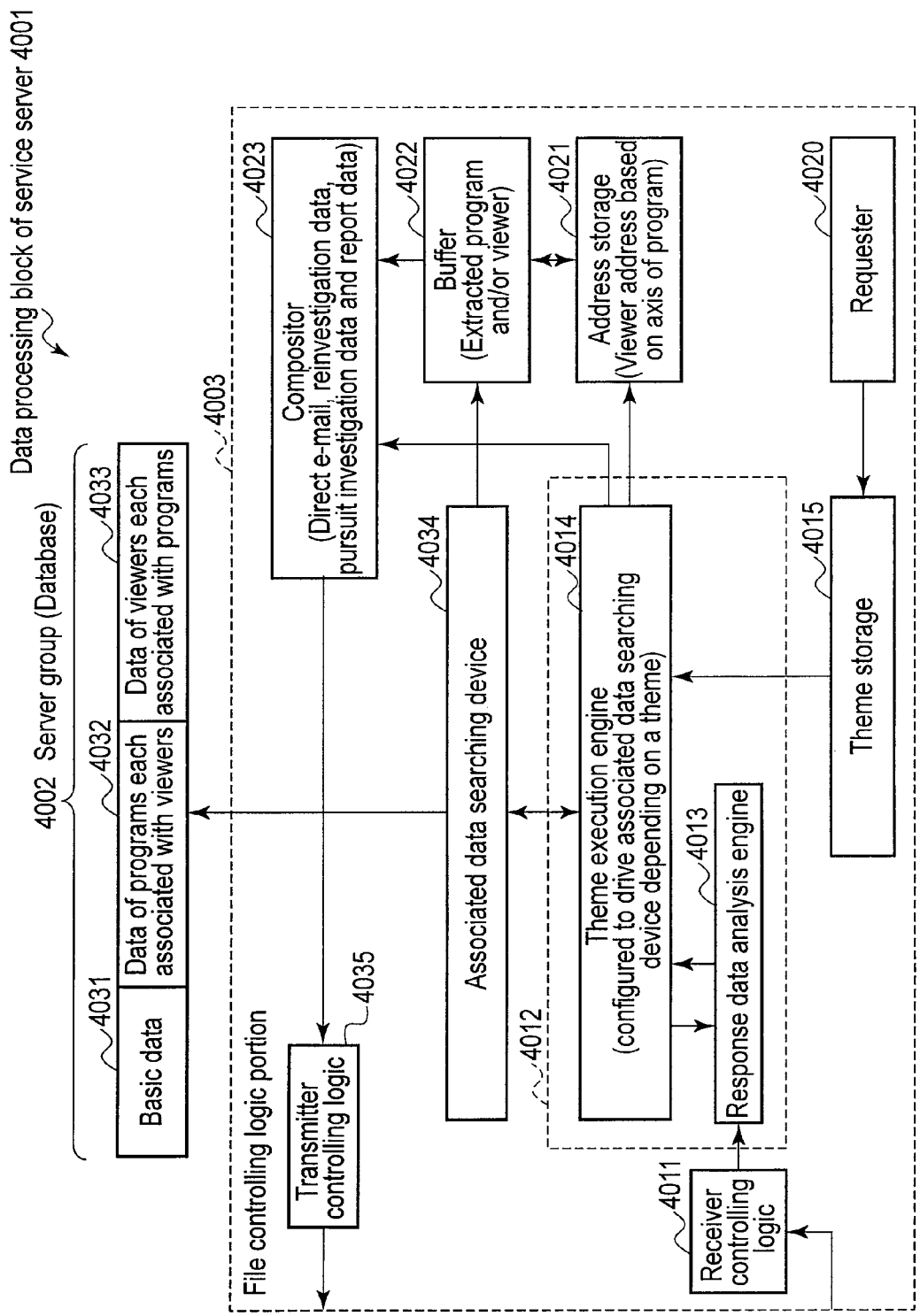
F I G. 35

SYSTEM, METHOD FOR PROCESSING ASSOCIATED DATA OF BROADCASTING PROGRAM AND E-MAIL SET, AND INFORMATION STORAGE MEDIUM

CROSS-REFERENCE TO RELATED APPLICATIONS

This application is based upon and claims the benefit of priority from Japanese Patent Application No. 2013-201427, filed Sep. 27, 2013, the entire contents of which are incorporated herein by reference.

FIELD

Embodiments described herein relate generally to a system, a method for processing associated data of broadcasting program and e-mail sets, and an information storage medium.

BACKGROUND

Nowadays, television sets (DTV) exchange information with servers on the Internet, personal computers, and mobile devices (such as feature phones, tablet computers, and personal digital assistants [PDAs]).

When the user wishes to obtain detailed information of a commercial (car by manufacturer A) that the user has watched on the DTV, the user can browse data of details of the car by manufacturer A on the mobile device or the personal computer.

However, prior art only provides viewers with data from the servers or the broadcasting stations in a one-way manner. So, the sponsor who provides a commercial releases detailed data of a commercial product on the server, without determining whether there are viewers who view the commercial. In addition, unless the viewer who has viewed the commercial accesses the server, the viewer cannot be provided with detailed data of the commercial product.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram illustrating a basic configuration example of a communication system to which the embodiment is applied.

FIG. 2 is a diagram illustrating an example of data collected by a server 4001 in the embodiment.

FIG. 6 is a flowchart illustrating another operation example in the DTV 1001 of FIG. 3.

FIG. 7 is a flowchart illustrating another operation example in the server 4001 of FIG. 3.

FIG. 9 is a diagram illustrating a representative configuration example of a direct e-mail request database managed by the server 4001 of FIG. 3.

FIG. 10 is a diagram illustrating a representative configuration example of a monitoring condition database managed by the server 4001 of FIG. 3.

FIG. 14 is a diagram illustrating a state where the DTV according to the embodiment is used on the network.

FIG. 15 is a diagram illustrating a configuration example of each server forming a time cloud server 4001 according to the embodiment.

FIG. 17 is a diagram illustrating an example of the screen in the case where, for example, an in-box "important system message" is opened on the screen of the DTV according to the embodiment.

FIG. 18 is a diagram illustrating an example of the screen in the case where a cursor has been moved to a position of a button B3 based on remote controller operation, in the screen of the DTV according to the embodiment.

FIG. 23 is a diagram illustrating an example of a picture displayed in the case where "System Announcement" is selected in the personal computer of the manager.

FIG. 24 is a diagram illustrating an example in which a template is displayed in the case where "System Announcement" is prepared in the personal computer of the manager.

FIG. 25 is a diagram illustrating another example in which a template is displayed in the case where "System Announcement" is prepared in the personal computer of the manager.

FIG. 27 is a diagram illustrating an example of a picture displayed in the case where "Marketing Announcement" is selected in the personal computer of the manager.

FIG. 28 is a diagram illustrating an example in which a template is displayed in the case where "Marketing Announcement" is prepared in the personal computer of the manager.

FIG. 29 is a diagram illustrating another example in which a template is displayed in the case where "Marketing Announcement" is prepared in the personal computer of the manager.

FIG. 30 is a diagram illustrating another example in which a template is displayed in the case where "Marketing Announcement" is prepared in the personal computer of the manager.

FIG. 32 is a diagram illustrating an example of a data file constructed in the server 4001, specifically showing basic data of programs.

FIG. 34 is a diagram for explaining an example in which programs are associated with each other in the server 4001.

FIG. 35 is a block diagram for explaining an operation example in the server 4001.

DETAILED DESCRIPTION

Figure 3:
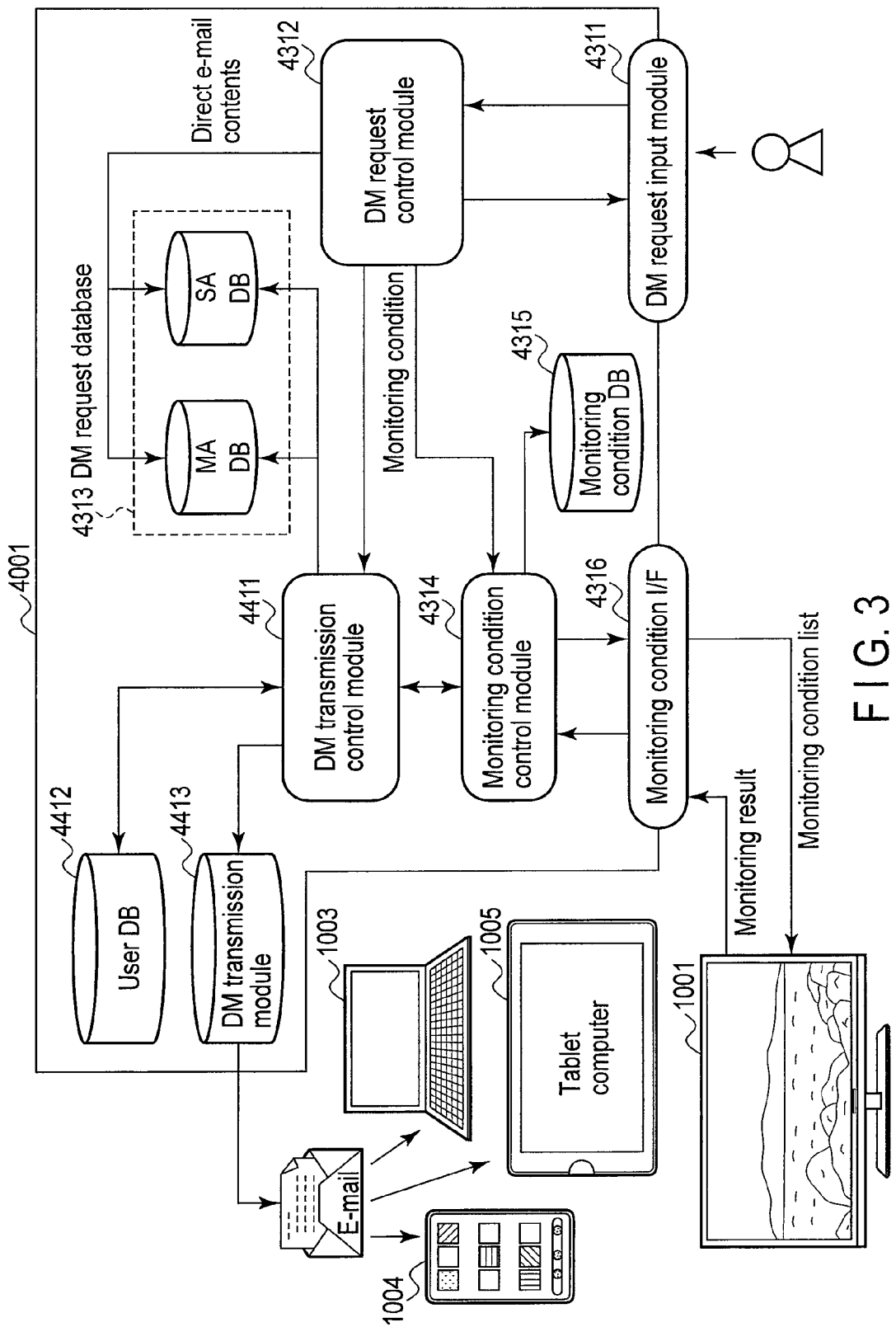
FIG. 3 is a block diagram illustrating a configuration example of the server 4001 in the embodiment.

Various embodiments will be described hereinafter with reference to the accompanying drawings.

An embodiment will be explained hereinafter. An object of an aspect of an embodiment of the present invention is to provide a system, a method for processing associated data of broadcasting program and e-mail set, and an information storage medium that enable one of effective use of a television set (DTV) for various data collection, collection of data of viewers who have viewed a target program, and direct transmission of detailed data of a commercial, announcement data, and inquiry data to the viewers (target viewers). According to one embodiment, a receiver 4301 receives first data that enables recognition that a first program has been viewed in a first television set. And a transmitter 4401 transmits a message, using the first data, the message is addressed to a first device registered in association with the first television set and includes information relating to the first program. The message is transmitted by using an e-mail system, for example.

An embodiment will now be explained in detail with reference to drawings. The embodiment will be explained as an example, and does not restrict names or block structures of the modules.

FIG. 1 illustrates a user device group 1000. The group 1000 includes, for example, a television set (hereinafter referred to as "DTV") 1001, a remote controller 1002, a mobile device (feature phone or smartphone) 1004, and a portable device (tablet computer) 1005.

The DTV 1001 can be operated by the remote controller 1002. The DTV 1001 can also be operated in a wireless manner by the mobile device (such as a feature phone or a smartphone, hereinafter referred to as a cellphone).

The personal computer 1003 can be connected to a server 4000 through a network 3000 by wired or wireless communication. The cellphone 1004 and the tablet computer 1005 can be connected to the server 4001 through the network 3000 by wireless communication. The DTV 1001 is a network TV, and can be connected to the server 4001 through the network 3000.

The server 4001 is connected to a broadcasting station 2001 included in broadcasting facilities 2000 in a wired or wireless manner.

The server 4001 may be connected with the broadcasting facilities 2000 through the network 3000.

The broadcasting station 2001 can transmit "announcement data (announcement data, which may be referred to as "announcement" or "notification")" requested from the server 4001 for a desired broadcasting program, through the same channel as that of the desired program, in a broadcasting period of the desired program, or a period of a certain time before or after the broadcasting period.

The server 4001 may also be referred to as "cloud server" or "service server". The server 4001 may cooperate with other servers. The DTV 1001 may be referred to as "client".

Types of the "announcement data" described above include system announcement (SM) and marketing announcement (MA), as explained below.

The system announcement (SM) includes a message that is officially transmitted from the server 4001 to all DTVs or part of DTVs. The contents of the message are, for example, maintenance information or trouble reports. The signal of the system announcement (SM) is transmitted from the server 4001 through a broadcasting line.

On the other hand, the marketing announcement (MA) includes a message to distribute advertisements to specific viewers, and transmitted as e-mails over a network.

The server 4001 includes a monitoring condition processor (this may be called a receiver) 4301, and a main distribution processor (this may be called a transmitter) 4401. The monitoring condition processor 4301 transmits a monitoring condition list to the DTV 1001 through the network 3000.

The monitoring condition list is stored in the DTV 1001. The monitoring condition list includes monitoring condition data such as the channel, program ID (referred to as target program name, or predetermined program), and broadcasting period. When a certain program is viewed, the DTV 1001 determines whether monitoring condition data relating to the program is included in the monitoring condition list. When the monitoring condition data relating to the viewed program (predetermined program) is included in the monitoring condition list, the DTV 1001 notifies the server 4001 of monitoring result data through the network 3000. The monitoring result data indicates that a predetermined program (target program) has been viewed in the DTV 1001.

Various embodiments exist for the transmission timing of the monitoring result data. For example, the monitoring result data is transmitted directly after determination as to whether the monitoring condition data relating to the program is included in the monitoring condition list or not, or after a predetermined time has passed since the determination (for example, the time when the program was ended). As a condition for determination, the determination may be executed when the program has been continuously viewed for at least a predetermined time (for example, 20 minutes or more).

The e-mail distribution processor 4401 of the server 4001 analyzes the monitoring result data. In the present example, suppose that the e-mail distribution processor 4401 has verified that the predetermined program has been viewed in the DTV 1001. Then, the e-mail distribution processor 4401 can transmit the marketing announcement (MA) to the personal computer 1003, the cellphone 1004, or the tablet computer 1005, with the e-mail address of the device registered in association with the DTV 1001.

The contents of the marketing announcement (MA) message are designated based on the data from the sponsor data processing server 4501.

The viewer who has viewed the target program can receive a marketing announcement (MA) relating to the viewed target program by the personal computer 1003, the cellphone 1004, or the tablet computer 1005. The viewer who has viewed the target program may be referred to as target viewer.

As described above, since the e-mail distribution processor 4401 has analyzed the monitoring result data and specified the target viewer, the target viewer is estimated to have viewed the target program with very high probability.

The target viewer can transmit "response data" to the server 4001 through the network 3000, by operating the personal computer 1003, the cellphone 1004, or the tablet computer 1005.

An address necessary for transmitting the "response data" may be specified by "return" operation, or stored in advance in the personal computer 1003, the cellphone 1004, and the tablet computer 1005.

As another example, a QR code (Registered Trademark) including an address serving as a transmission destination of the response data may be displayed on the screen of the DTV 1001 together with "announcement". The cellphone 1004 equipped with a camera or the tablet computer 1005 reads the QR code, and thereby the transmission destination (address) of the response data can be automatically set. The address of the transmission destination may be manually input by the user to the transmitting device, as a matter of course.

The "response data" may be input to the DTV 1001 by a user's operation for the remote controller 1002, and transmitted from the DTV 1001 to the server 4001 through the network 3000.

As described above, the monitoring condition list including data relating to the target program is distributed from the monitoring condition processor 4301 to many viewers, or viewers who satisfy preset recipient conditions. When the target program is viewed, the DTV 1001 transmits the monitoring result data to the e-mail distribution processor 4401 through the network 3000.

As a result, the e-mail distribution processor 4401 can accurately recognize the DTV on which the predetermined program (target program) has been viewed. In addition, the e-mail distribution processor 4401 can transmit e-mails to definite viewers (target viewers) who have viewed the predetermined program, by using e-mail addresses registered in association with the DTVs 1001. Thus, efficient e-mail distribution processing can be performed without loss. Thus, the rate of collection of "response data" is increased.

Specifically, the monitoring conditions (for example, users who viewed channel A at certain time) are determined in advance, and a notification is sent to the server, when the DTV determines that the DTV fulfills the conditions. Thereby, the server can transmit questionnaires and advertisements only to users who viewed the program. Thus, improvement in reliability of the questionnaire can be expected, and the users are relieved from a nuisance of receiving questionnaires or advertisements relating to programs that they have not viewed at all.

FIG. 2 schematically illustrates a state where monitoring result data items from DTVs 1003a, 1003b, 1003c, . . . are collected at the server 4001. In this example, data in the database of the server 4001 shows that there are viewers a1, a2, a3, . . . who viewed a target program A, and there are viewer b1, b2, b3, . . . who viewed a target program B. The e-mail distribution processor 4401 of the server 4001 can accurately recognize DTVs (target viewers who viewed the program) on which the predetermined program (target program) was viewed.

FIG. 3 illustrates a configuration example of the inside of the server 4001.

The server 4001 is provided with a direct e-mail request input module 4311 as a user interface.

The direct e-mail request input module 4311 may receive, for example, data from the sponsor data processing server 4501 of FIG. 1. As another example, the user or the message manager can directly input distribution data to the direct e-mail request input module 4311 from the personal computer or the like.

The distribution data includes recipient condition data (for example, including a message text as a direct e-mail, and recipient specifying <or designating> data), and monitoring condition data (including identification data <ID>, broadcasting start time, and broadcasting end time of the target program). The direct e-mail request input module 4311 may be a Website interface described in HTML.

An e-mail text of the distribution data input from the direct e-mail (DM) request input module 4311 is stored in the direct e-mail request database module 4313, based on control by the direct e-mail request control module 4312. In this case, user conditions can be added to the e-mail text (direct e-mail). For example, the user conditions include data of all the viewers, male viewers, female viewers, specific designated viewers (for example, viewers registered as members), or viewers of a specific area, or a combination thereof.

A request ID is automatically added to a text of each e-mail, and a title may be added. In addition, a start time to be monitored, an end time to be monitored, and a channel to be monitored are added to the e-mail text.

Distribution time information to synchronize with the program broadcasting time can be added to the e-mail text.

The data (such as the broadcasting start time, broadcasting end time, broadcasting channel, . . . , and program name) relating to the target program and included in the distribution data is transmitted from the direct e-mail request control module 4312 to the monitoring condition control module 4314 as "monitoring conditions". A monitoring ID is automatically added to the monitoring conditions.

The monitoring condition control module 4314 generates a monitoring condition list from the monitoring condition data. As the monitoring condition list, for example, a set is formed of the monitoring time (broadcasting start time, broadcasting end time) and the monitored channel (broadcasting channel). A plurality of sets may be formed by changing the monitoring time or the monitored channel.

The monitoring condition control module 4314 stores the list data of the monitoring conditions in a monitoring condition database 4315.

The monitoring condition list may be updated for each predetermined time. This is because the monitoring condition list may become insignificant when the broadcasting program is ended.

The monitoring condition list is transmitted to many DTVs, through a monitoring condition interface 4316 and the network.

When monitoring result data is transmitted from a DTV, the monitoring result data is received by the monitoring condition interface 4136. The monitoring condition control module 4314 transmits the received monitoring result data to the direct e-mail transmission control module 4411. The monitoring condition control module 4314 adds viewer data to the monitoring conditions of the target program, based on the received monitoring result data.

Thereby, the target program is associated with the target viewer who has viewed the target program, in the monitoring condition database 4315.

The target viewer can transmit direct e-mail refusal data for the DTV 1001 to the server 4001, by performing a special operation for the DTV 1001.

The following is an explanation of the operations performed by the server 4001 when the direct e-mail distribution time comes. The direct e-mail distribution time is set to a period which is 5 minutes to 30 minutes after the broadcasting time of the target program has ended, or a period during the broadcasting time of the target program and 5 minutes to 30 minutes after the target commercial has been broadcast.

Before the direct e-mail distribution time, the direct e-mail request control module 4312 notifies the direct e-mail transmission control module 4411 of a request to issue direct e-mails. In the operation, the target program has been specified.

The direct e-mail transmission control module 4411 specifies target viewers to receive the e-mail, from the monitoring condition database 4315 through the monitoring condition control module 4314.

The direct e-mail transmission control module 4411 obtains the direct e-mail contents to be transmitted to the target viewers, from the direct e-mail request database 4313. In addition, the direct e-mail transmission control module 4411 obtains an address of the personal computer 1003, the cellphone 1004, or the tablet computer 1004 of each target viewer from a user database 4412.

Thus, the direct e-mail transmission control module 4411 can specify the transmission destinations of the direct e-mail, the contents of the direct e-mail, and the direct e-mail transmission time, and set the transmission data in the direct e-mail transmission module 4413. Thereby, the direct e-mail can be efficiently transmitted to the devices of the target viewers.

As described above, the monitoring condition processor 4301 functions as a receiver 4301 that receives first data that enables recognition that the first program has been viewed in, for example, the first television set 1001. The e-mail distribution processor 4401 functions as a transmitter 4401 that transmits an e-mail including information relating to the first program and having a first device registered in association with the first television set as a destination, using the first data.

Figure 4:
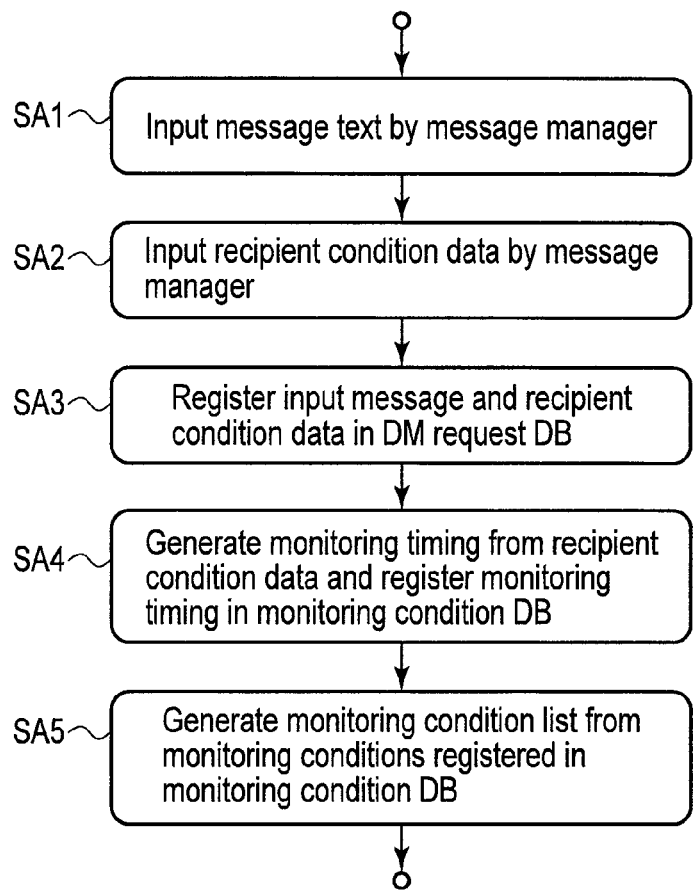
FIG. 4 is a flowchart illustrating an operation example in the server 4001 of FIG. 3.

FIG. 4 illustrates steps SA1 and SA2 in which the message manager inputs the message text serving as a direct e-mail, and recipient condition data (including recipient specifying [designating] data) in the server 4001. FIG. 4 also illustrates steps SA3 and SA4 in which monitoring timing is generated from time data, when the message manager inputs monitoring condition data (including the identification data [ID], broadcasting start time, and broadcasting end time of the target program). The monitoring condition data is stored in the monitoring condition database 4315.

In addition, step SA5 indicates that the monitoring condition control module 4314 generates a monitoring condition list relating to a plurality of programs from the monitoring condition data.

Figure 5:
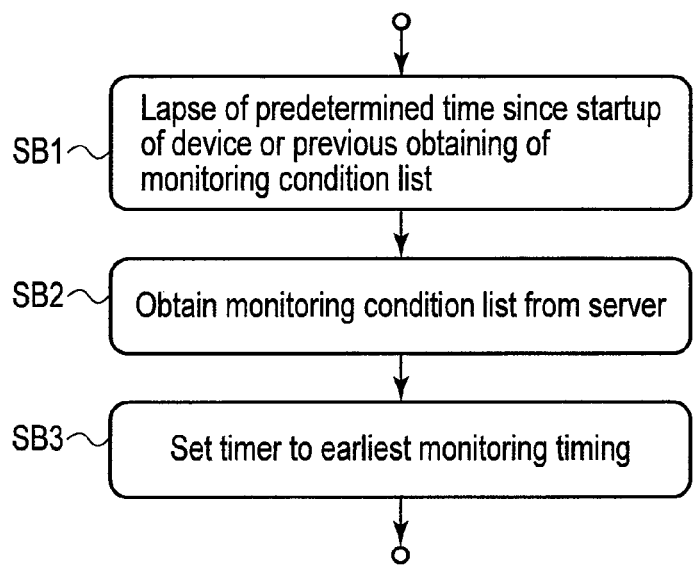
FIG. 5 is a flowchart illustrating an operation example in a DTV 1001 of FIG. 3.

FIG. 5 is a flowchart illustrating an operation of obtaining a monitoring condition list from the server 4001 by the DTV 1001. For example, when a certain time has passed from the time when the previous monitoring condition list was obtained, the network connection function is started by the controller of the DTV 1001, and the controller accesses the server 4001 (Step SB1). Next, the controller obtains the monitoring condition list from the server 4001 (Step SB2). Then, the controller analyzes the monitoring condition list, and sets the timer to the earliest monitoring timing. Specifically, the controller sets the timer to the monitoring timing to determine whether the program that is broadcast at the earliest time among the broadcast programs included in the monitoring condition list is viewed or not (Step SB3).

FIG. 6 illustrates an operation which the DTV 1001 can perform when the present time has reached the time set by the timer. The controller of the DTV 1001 receives a timer event (Step SC1). Then, the controller obtains information of the channel which the user is viewing (Step SC2). Thereafter, the controller determines whether the obtained channel information is included in the monitoring conditions (Step SC3). When the obtained channel information is included in the monitoring conditions, the controller notifies the server 4001 that the monitoring conditions agreed, that is, transmits monitoring result data to the server 4001 (Step SC4). After the transmission, the controller sets the timer to the next monitoring timing (Step SC5).

FIG. 7 illustrates an operation performed when the server 4001 has received monitoring result data from the DTV 1001 (client). When the server 4001 receives monitoring result data (Step SD1), the monitoring condition control module 4314 adds viewer data (user ID) to the monitoring conditions of the target program in the monitoring condition database 4351, based on the received monitoring result data (Step SD2). Thereby, the target program is associated with the target viewer (user ID) who has viewed the target program, in the monitoring condition database 4351.

Figure 8:
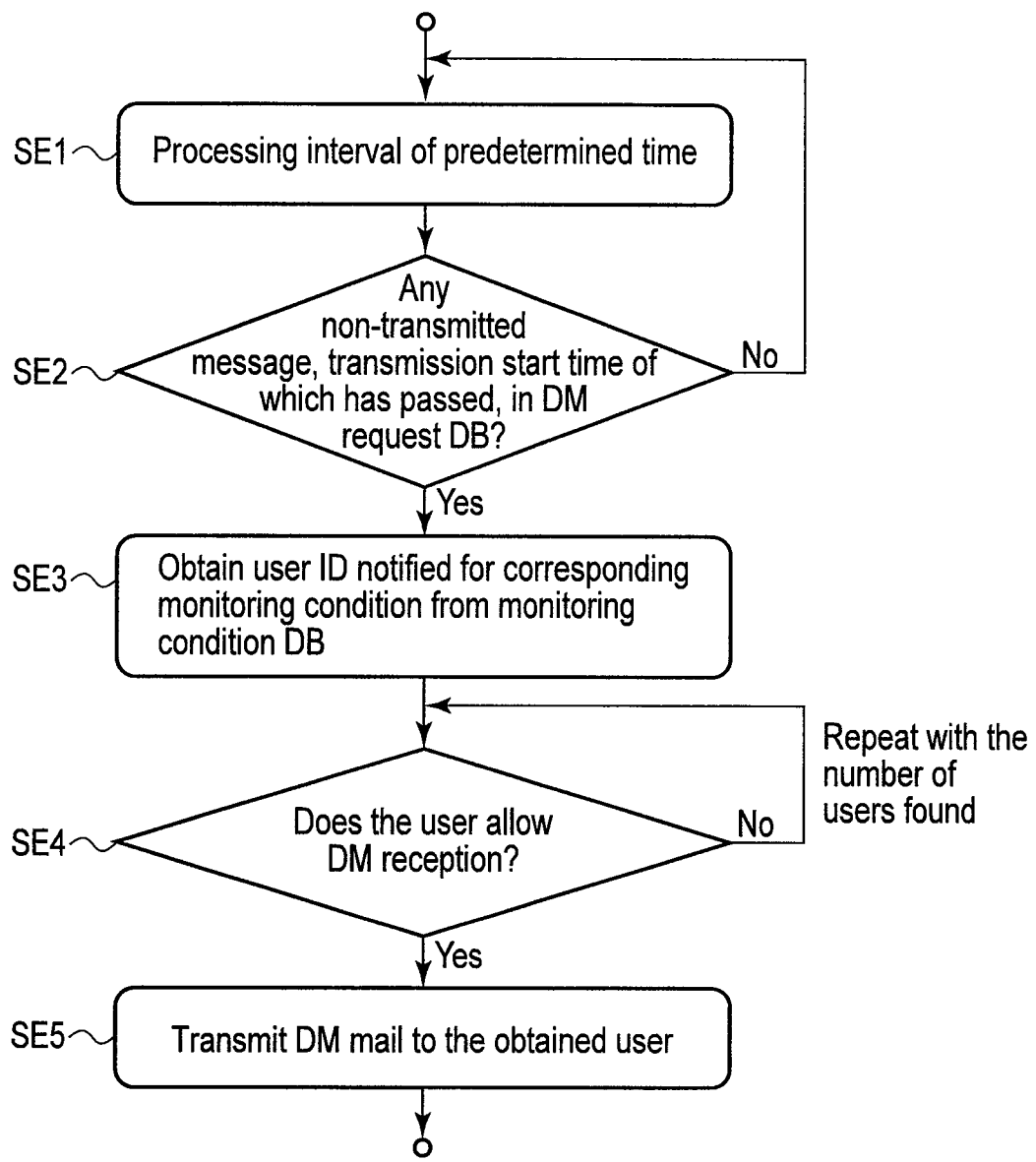
FIG. 8 is a flowchart illustrating another operation example in the server 4001 of FIG. 3.

FIG. 8 illustrates an operation performed when a direct e-mail is distributed to target viewers from the server 4001.

A processing interval of a predetermined time is set for direct e-mail distribution (Step SE1). When the processing time is come, the direct e-mail request control module 4312 notifies the direct e-mail transmission control module 4411 of a direct e-mail issuance request.

Next, it is determined whether there is any non-transmitted data message, a transmission start time of which has passed, in the direct e-mail request database 4313 (Step SE2).

When there is a non-transmitted data message with the transmission start time that has already been passed, the user ID (target viewer) corresponding to the non-transmitted data message is identified from the monitoring condition database 4315 (Step SE3). In addition, it is determined whether the user corresponding to the user ID allows reception of a direct e-mail (Step SE4). When the user allows reception of a direct e-mail, the server 4001 transmits a direct e-mail to the identified target viewer (Step SE5).

FIG. 9 is a diagram illustrating an example of a database format stored in the direct e-mail request database 4313.

FIG. 10 is a diagram illustrating an example of a database format stored in the monitoring condition database 4315. The viewer user ID indicates identification data (ID) of target viewers who have viewed the target program.

The monitoring condition data is prepared based on settings (filtering) of the monitoring conditions prepared in the server 4001. The monitoring conditions may include not only the broadcasting period of the broadcasting program, but also the cast, category, commercial data, and subtitle data designation. The DTV can obtain data such as the cast and category from the program information (EPG data).

As described above, according to the embodiment, the server can receive result data indicating that a predetermined program has been viewed in a television set from the television set, identifies the device registered in association with the television set that outputted the result data, based on the obtained result data, and distribute an e-mail including inquiry data relating to the predetermined program to the identified device.

The inquiry data includes a message indicating that the user can obtain any special favor when the user responds to the inquiry. The special favor is, for example, a merchandise coupon or a service credit. The inquiry data is an inquiry about basic data of the predetermined program. For example, the inquiry data is an inquiry about the viewer's interest in the product in a commercial, viewer's impressions of the predetermined program, viewer's interest in the cast of the predetermined program, and tools and clothes used in the predetermined program.

The monitoring condition processor 4301 transmits the monitoring condition list including the monitoring condition data to at least the television set. The monitoring condition data is data for determining whether the program viewed on the television set satisfies the predetermined conditions and obtain the result data.

The monitoring condition data can include a plurality of filtering elements to obtain the predetermined conditions. The monitoring condition data can also include the program identification data of the predetermined program, the channel code of the predetermined program, and the broadcasting period of the predetermined program.

The monitoring condition data can also include a plurality of channel codes for the predetermined program. The addresses of the identified devices 1003 to 1005 are addresses transmitted from the television set.

The operations of the structural blocks illustrated in FIG. 3 may be executed by a computer based on software. The embodiment can include a code to cause the server to receive by a computer result data indicating that a predetermined program has been viewed in a television set from the television set, a code to cause the server to identify the device registered in association with the television set that outputted the result data, based on the result data obtained by the computer, and a code to cause the server to distribute an e-mail including inquiry data relating to the predetermined program to the identified device. The codes may be stored in a computer-readable storage medium.

Figure 11:
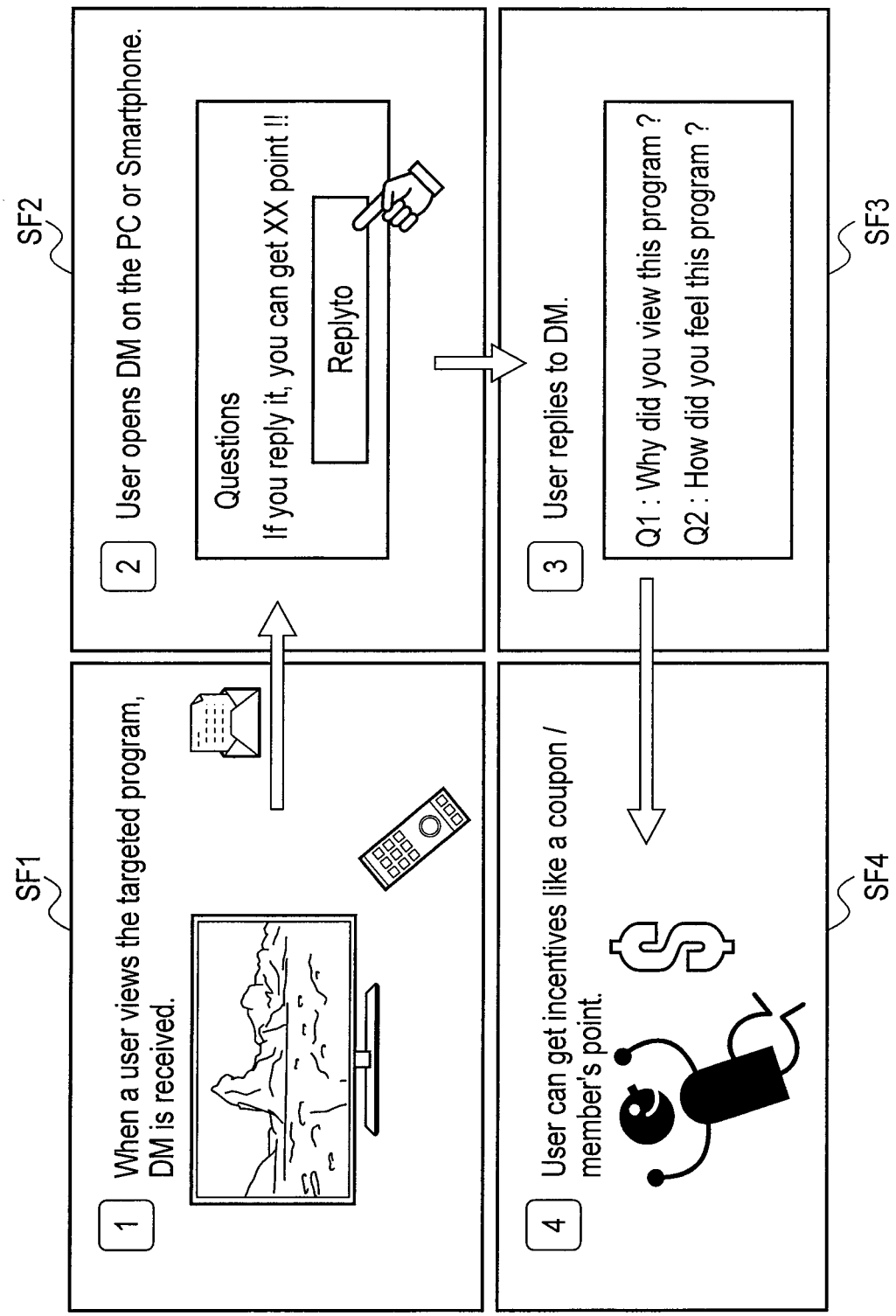
FIG. 11 is a diagram illustrating a representative example of the case where the user who uses the system of FIG. 1 receives a direct e-mail, responds to the direct e-mail, and obtains a point.

FIG. 11 illustrates a time lapse of events when the above system is used. When the viewer has viewed a target program, the viewer can receive a direct e-mail by a mobile device (PC or smartphone) (Event SF1). The direct e-mail on the screen shows a message such as "You can get a 50¢ service credit if you reply to the question". When the viewer presses the Reply button, questions such as "Why did you view this program?" and "How did you feel about this program?" are displayed (Event SF2). Then, when the user replies to the questions and sends the reply to the server, the user can obtain a service credit (Event SF3) (Event SF4).

<Detailed Example of DTV and Relationship Thereof to Server>

Figure 12:
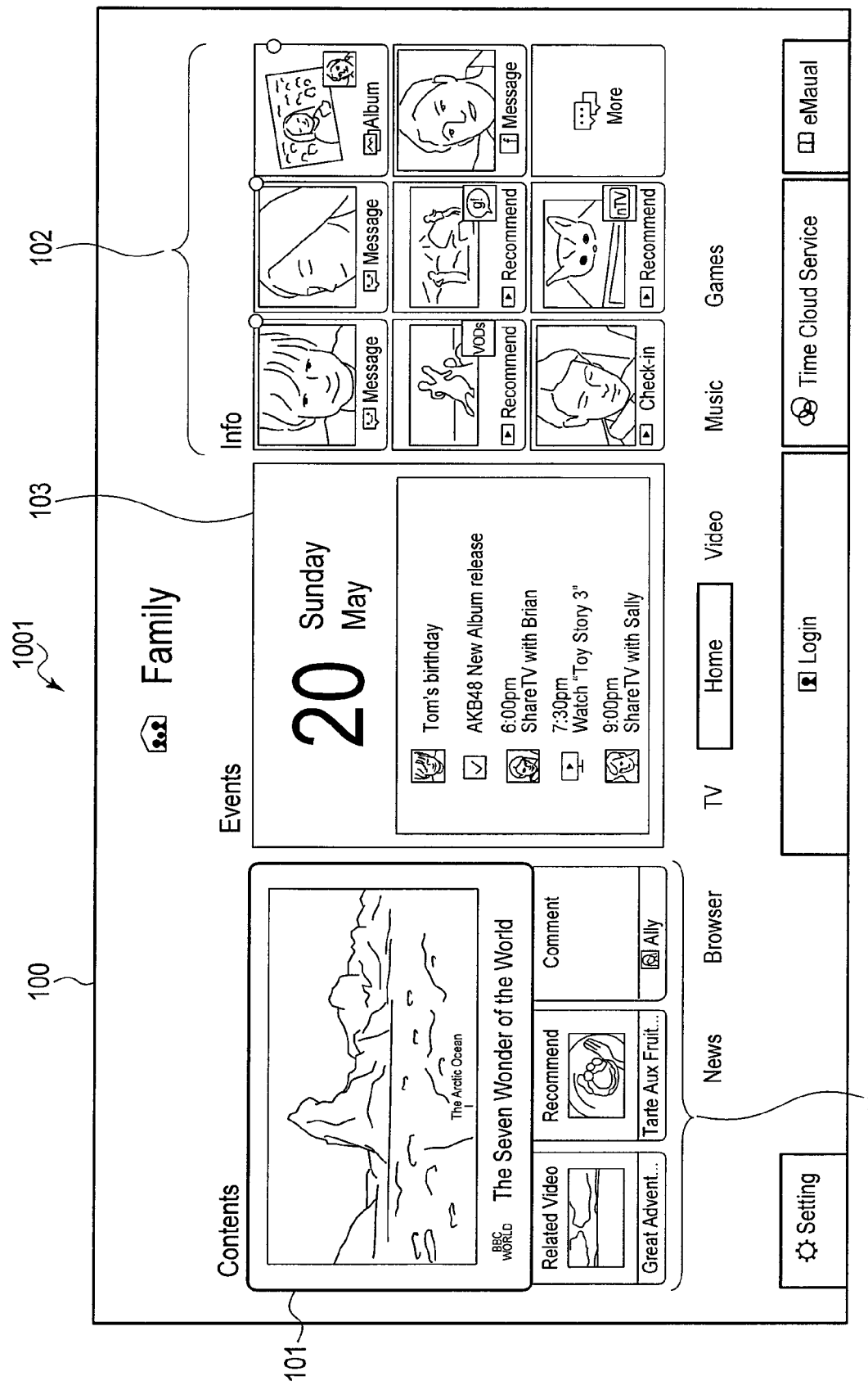
FIG. 12 is a diagram illustrating a state where the DTV according to the embodiment is connected to a cloud server and an initial menu picture is displayed.

FIG. 12 illustrates a state where the DTV 1001 is connected with the cloud server 4001, and the initial menu picture 100 is displayed.

In a display area 102, guide images for various types of out- and in-boxes to receive notifications from family and friends and recommendation data are displayed. There are out- and in-boxes for Outlook, e-mail, message and recommendation data, etc. A unique name can be added to the screen frame showing each out- and in-box. It is also possible to select a favorite image from an image file and add the selected image as a guide image.

If a message or recommendation data has been received in an out- and in-box, for example, a corresponding guide image is displayed with a circular mark, with a changed frame color, or with the brightness of the frame repeatedly changed. If a plurality of items of recommendation data have been received in an out- and in-box, a corresponding guide image may be displayed with a plurality of circular marks, or the number of received items of recommendation data may be described on the frame.

For example, the above out- and in-box (at the state of the display area 102) can be used for communication between family members and communication between a family member and a friend. An album may be transmitted from a friend or a brother who lives away from home. Recommendation data may be transmitted from a friend. Recommendation data is, for example, recommended program information, recommended shopping information, recommended scene information or recommended performer information.

Moreover, a plurality of functional guide images are displayed in an area 104 under an area 101. The functional guide images are used when a user operates the DTV 1001 in connection with the replay picture displayed in the area 101. The guide images can be used when, for example, a viewer (user) communicates with an external server (another user) in connection with the replay image displayed in the area 101.

<Usage Examples of Guide Images in Display Area 102>

For example, a user can operate a remote controller (a mobile device may serve as a remote controller), and set the cursor on the desired guide image (for example, the guide image for a message from a mother to a child). The guide images may be referred to as operation buttons. For example, a cursor is displayed as a frame surrounding a guide image. When a cursor is positioned on the desired guide image and the enter button of the remote controller is pressed (clicked), the out- and in-box corresponding to the guide image is opened, and for example, a message is displayed. For the message, for example, all of or a half of the area 102 can be used.

A user can also operate a remote controller and open the out- and in-box for recommendation data. Recommendation data may be, for example, recommended program information showing a recommended program sent from a friend, or recommended shopping information. A user may be interested in the recommended program and want to watch the program. If the user sets the cursor on the selection button of the recommended program information which is displayed and presses the enter button, the DTV 1001 automatically begins the reproduction of the program. In this case, the replay image of the program may be displayed in the small screen, and the image may be displayed in the large screen when the user presses the enter button next time.

The out- and in-boxes can be also used when a message is transmitted to the out- and in-box of the communication partner or a mobile device. Recommended program information is displayed as, for example, a title name, some scenes within a program, a performer name or the image of a performer. Recommended program information also includes a broadcasting channel number, a broadcasting date and time, the information of cast prologue and a contents server address, etc.

The DTV 1001 obtains program contents by means of the first method and the second method. In the first method, a recording device connected to the DTV 1001 is driven to obtain program contents. In the second method, program contents are downloaded from the contents server via the Internet. In the first method, a program list search function of a program recorded in the recording device is operated. In the second method, the address of the contents server included in the previous recommended program information is used.

By using the guide images of the display area 102, e-mails and short messages, etc., can be transmitted to a family member or a friend registered in an administration device which controls the guide images. In this case, a friend is a friend common to the members of the family. Information of other families and friends common to the members of the family is recognized and registered in an administration device for a family. In the administration device, the guide images for a family are stored and controlled.

<Usage Examples of Guide Images in Display Area 104>

For example, in the drama program which is currently viewed and displayed in the area 101, a user may have a favorite scene or a scene in which a favorite star appears. If a user operates a remote controller, selects the guide image for the recommend and presses the enter button, the program information of the program viewed by the user is uploaded to the server as attention (or notice) program information. The server can use the attention program information as material for generating recommended program information and/or information for generating a tag list of the program. Since attention program information related to various programs is sent from many viewers to the server, the server is configured to conduct a statistical process, using the attention program information. By conducting the statistical process, a program information list in which programs are arranged in descending order of popularity can be prepared.

Moreover, a user can operate a remote controller, select the guide image for the comment and press the enter button. At this time, a screen for inputting a short message regarding the program which is viewed by the user and displayed in the area 101 appears, and the user can input a message. A message can be input from, for example, a remote controller or the keyboard display of a mobile device.

Figure 13:
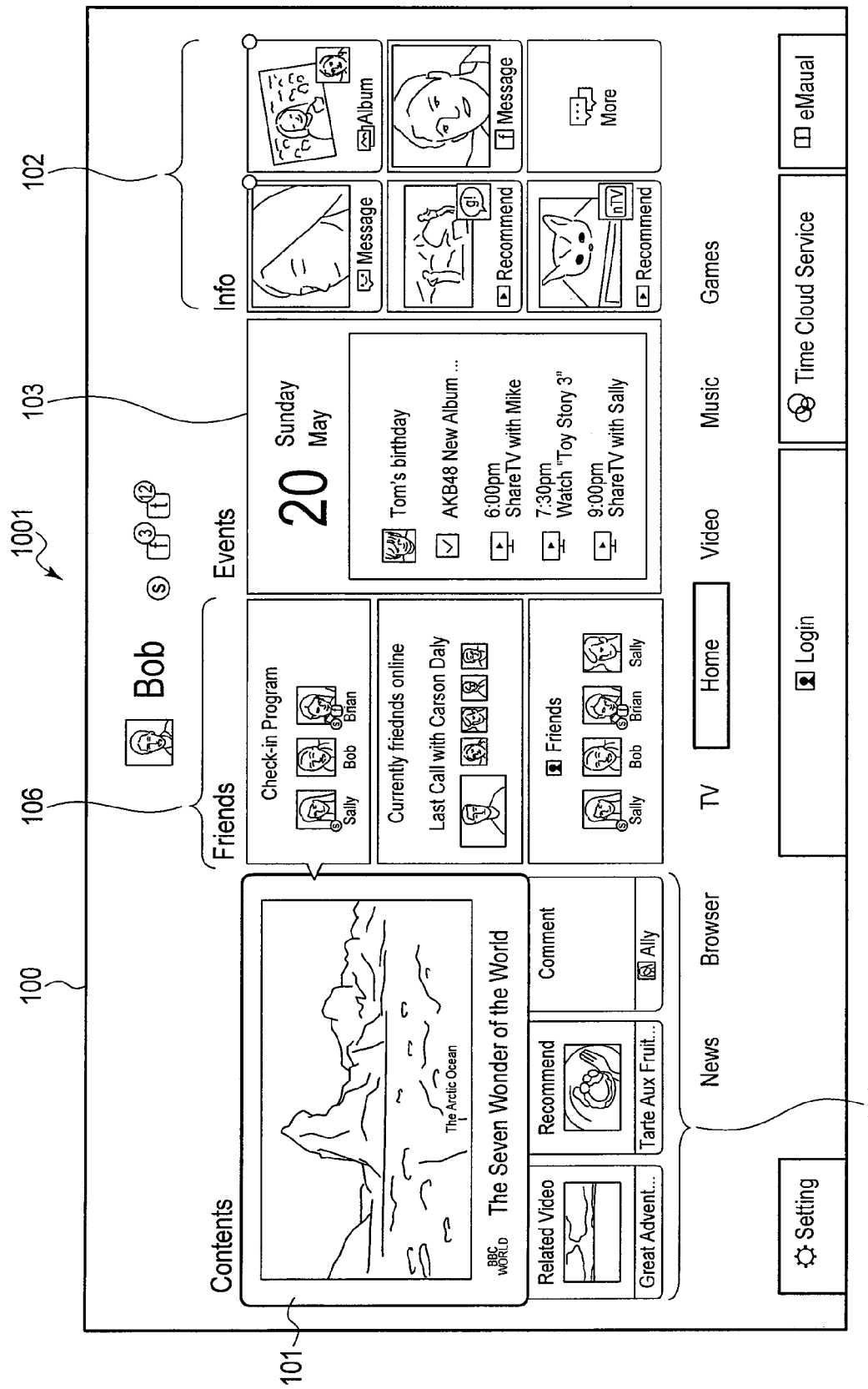
FIG. 13 is a diagram illustrating a display state of a screen 100 displayed when the DTV according to the embodiment has been connected to the cloud server through a network and logged in with a personal ID.

FIG. 13 shows the display state of the screen 100 when the DTV 1001 is connected to the cloud server via the network and logs in the server with a personal ID. In the screen 100, a display area 106 for guide images for communicating with friends can be obtained between the area 101 and an area 103. In the display area 106, for example, three types of guide images exist. As the top guide image (Check-in Program), a list of others (Friends) who are concurrently viewing the program currently viewed by the user is displayed. As the middle guide image (Friends Currently Online), a list of others (Friends) who are viewing a program different from the program currently viewed by the user is displayed. However, the DTVs 1001 of these friends are connected to the network. As the lower guide image (Friends), a list of others (Friends) whose DTVs 1001 are not connected is displayed. The state at which the DTV 1001 logs in is regularly sent to the server. Therefore, the server is configured to identify a user (DTV) who is not connected to the network, a user (DTV) who is connected to the network and a user (DTV) who is connected to the network and is viewing the same program. Thus, the server monitors the status of a plurality of users, and reports the status to each user. Therefore, the DTV 1001 is configured to present three types of guide images shown in the display area 106. Each user registers friends in the friend register of the server in order to associate friends with each other.

<Usage Examples of Guide Images in Display Area 106>

For example, if son B of friend A appears in the currently-viewed drama program, the user may want to notify friend A or the family of friend A of the fact. If friend A is searching for a lost dog C and the user views news of dog C, the user may want to inform friend A or the family of friend A as to the news. In these cases, the user can use the guide images displayed in the area 106.

A user can operate a remote controller, select the guide image displaying the desired friend by a cursor, and press the enter button. If the user presses the button, the screen can be transferred to the state at which a message can be sent to the selected friend.

For the above communication, the guide images which describe the recommend and message in the display area 102 can be also used. A user can operate a remote controller, select the guide image displaying the desired image by a cursor and press the enter button. In this case, a message can be sent to the family or person registered in the out- and in-box of the selected image. The guide images of the display area 106 can be used mainly for private communication.

<Usage Examples of Guide Images in Display Area 103>

In the guide images in the display area 103, a calendar is displayed. In addition, events and schedule titles on the day are simply displayed. When a user wants to know the detailed information of an event or a schedule, the detailed information is further displayed by selecting the event or the title of the schedule with a cursor and clicking the event or the title. For example, the detailed information can be browsed at a URL.

In the above calendar, the schedules of a user, etc., can be described. When the display area of the calendar is selected with a cursor, the items in use of the calendar are displayed. When the schedule writing item is selected, a schedule can be input from a remote controller or a mobile device.

<Move of Operation Screen>

Excluding the viewing image of the area 101, the above-described guide images can be also displayed in a mobile device (smartphone) comprising a displaying portion which is a touch type of input operating portion. The DTV 1001 is configured to transfer the above guide images and operation signals corresponding to the guide images to a mobile device through a communication function. Thus, the mobile device is configured to maintain the communication state with the DTV 1001 and operate the DTV 1001 by the use of the guide images as described above.

<Examples of Block Structure of DTV 1001>

FIG. 14 shows the state of the case where a DTV according to one embodiment is used on a network. In the DTV 1001, basic functions as a television (television signal reception, demodulation, control signal processing, 3D associated signal processing, recording, audio processing, video processing and display function, etc.) are shown as a DTV functional block (or module) 14 as a whole. The DTV functional block 14 is connected to an information processor 222 through a DTV interface 15. The information processor 222 may be referred to as a browser section.

In this example, the information processor 222 comprises a cloud application portion 231, an application common portion 232 and a socket portion 234. Classification is not limited to this example, and the cloud application portion 231 may be defined as the information processor 222.

The socket portion 234 comprises a server Web socket from the perspective of the DTV interface 15 and a client Web server from the perspective of a browser.

The cloud application portion 231 comprises an overall controller 241, a view controller 242 and a model 243. The overall controller 241 conducts various event processes in reply to commands and instructions. The overall controller 241 realizes various drawing processes by controlling the view controller 242. The view controller 242 is configured to obtain various types of images and controlling signals within the screen 100 explained before. The images and controlling signals based on the operations of the view controller 242 are reflected as images and controlling buttons in the display portion of the TV apparatus via, for example, the model 243 and the socket 234.

The model 243 accesses a server, obtains information from a server, transmits information to a server, operates a DTV and receives data from a DTV, etc. Therefore, it is possible to receive a message from a DTV and transmit the message to a server. Moreover, the message received from a server can be displayed on the screen of the display portion of a DTV in cooperation with the view controller 242. The server may be an application server 410, a time cloud server 411, or a log collector server 412, etc. Further, there are other types of servers (not shown in the figure).

A user can operate a remote controller 11 to control a DTV and the information processor 222. The operation signals from the remote controller 11 are distributed in a moderator 12. The key event distributed for the cloud application portion 231 is input to the overall controller 241. The key event distributed for the application common portion 232 is input to the application common portion 232 through a browser user interface 13. The application common portion 232 is configured to request the application designated for the application server 410 in accordance with the application request command. The application sent from the application server 410 is loaded into the cloud application portion 231 through the model 243. The log collector server 412 is configured to collect a log used in the information processor 222 and other connection devices.

FIG. 15 shows the structure examples of the information processor 222 and the DTV functional block 14 defined in FIG. 14, associating them with each other. The overall controller 241 comprises a DTV controller 2411, a login identifier managing module 2412, a communication data managing module 2413, and a login identifier transmitter 2414.

The DTV controller 2411 may control the DTV functional block 14 based on a user operation, and may control the DTV functional block 14 based on the control data from the cloud server 411. When a login operation is conducted and a login identifier is input, the login identifier managing module 2412 controls the save of the login identifier, and manages login identifiers for a family and an individual as table data.

The communication data managing module 2413 manages communication data, dealing with each login identifier. For example, when the login user accesses an external server, this history data is managed. The history data includes the accessed address and transaction data. The communication data managing module 2413 is configured to classify and save data sent from the cloud server 411, and is also configured to use the data as data for display.

The login identifier transmitter 2414 transmits the login identifier used for login to the cloud server 411. The cloud server 411 manages login identifiers from many users and uses them when offering the guide images previously explained in the menu screen.

The view controller 242 comprises a demonstration image controller 2421 and a guide screen controller 2422. By this structure, demonstration images and guide images can be provided to the DTV side.

The DTV functional block 14 comprises a one-segment receiving processor 141 configured to receive signals from an antenna, a receiver 142 configured to receive satellite broadcasting and terrestrial digital broadcasting, and a demodulator 143. The receiver 142 and the demodulator 143 comprise a plurality of tuners and are configured to simultaneously receive and demodulate broadcasting programs of a plurality of channels.

A plurality of demodulated program signals can be converted into a DVD (registered trademark) format in a DVD (registered trademark) device 14A and recorded on a Digital Versatile Disk. Alternatively, the demodulated program signals can be converted into a BD (registered trademark) format in a BD device 14B and recorded on a Blu-ray (registered trademark) Disk. An arbitrary stream can be recorded on a hard disk in a hard disk drive 14C.

The DVD device 14A, the BD device 14B and the hard disk drive 14C are connected to the DTV functional block 14 via a home network connector 148. The hard disk drive 14C may be connected via a USB cable. The hard disk drive 14C may, for example, simultaneously record all programs of a plurality of channels (for example, six channels which were set) for approximately, for example, one to three weeks. This type of function is sometimes referred to as a time-shift function. Moreover, a hard disk drive may be additionally provided.

The network connection device and the recorded program information are controlled in a TV controller 140 and may be transmitted to the cloud server 411 via an information processor. In this case, the cloud server 411 is configured to ascertain the network connection device and recorded program information at the user's home. Therefore, when various types of scenes are reproduced based on scene list information, the cloud server 411 is configured to specify even the connection device in which the scenes have been recorded at home.

Within the DTV functional block 14, the demodulated program signals or the program signals reproduced from a recording medium such as a DVD, a BD or a hard disk drive (HDD) are adjusted in various ways (brightness adjustment and color adjustment, etc.) in the signal processor 144 and displayed on the screen 100 which is a display portion via an output portion 145.

The DTV functional block 14 comprises a power circuit 146 configured to arbitrarily switch its state of use to an AC power use state or a battery use state 147. This switching of the power use state may be forcibly conducted by a user with a remote controller operation, or may be automatically implemented based on external information.

The cloud server 411 is configured to transmit a control signal which automatically switches a TV device to a 3D processing state. Furthermore, the cloud server 411 is configured to transmit an audio controlling signal and/or an audio signal based on each scene to a TV device. Moreover, the cloud server 411 is configured to transmit extended chain data including adjustment data of an image depending on the scene.

The DTV functional block 14 comprises a short-range wireless transmitting-and-receiving portion 149. It is possible to transmit data to a mobile device or receive data from a mobile device via the short-range wireless transmitting-and-receiving portion 149. A mobile device is configured to require an operation image from the DTV functional block 14. When an operation image is required, the DTV functional block 14 is configured to transmit a guide image to the mobile device. A user can control the above information processor, using the guide image of the mobile device.

A user can connect a mobile device to a network, using a guide image. Thus, it is possible to obtain a communication state between a mobile device and the cloud server.

The DTV functional block 14 is configured to check the control data sent from the cloud server 411, and automatically reflect the data as an operation state.

According to the above-explained system, basically, the information processor transmits data (control signals corresponding to a scene information key, a scene list key and a scene play key) which is a trigger to the server via the network connector in response to the first operational signal of a user. Next, the information processor obtains extended chain data which is sent back based on the trigger data, and classifies and saves the first control signal (instruction) which is included in the extended chain data and is used for automatic control, and the second control signal (instruction) which responds to the second operational signal of the user. The signals are saved in the overall controller or the model. An autonomous operation can be conducted based on the first control signal (instruction), and/or a heteronomous operation can be conducted based on the second control signal (instruction).

An autonomous operation means that the operation is automatically performed. For example, the operation is the acquisition of the display image of the area 106 and the control of the DTV functional block 14. A heteronomous operation means the wait for a user operation. This operation means the response to the second operational signal when the second operational signal is input from the user.

This operation is an operation to respond to inquiry data, an operation to respond to tag list selection and an operation to respond to scene list selection, etc. Further, extended chain data includes data for display. This data for display includes various types of messages and albums. When an instruction to save electricity is sent from the time cloud server 411, the DTV functional block 14 is configured to implement an operation for saving electricity. For example, in order to save electricity, the DTV functional block 14 switches a full-segment reception state to a one-segment reception state, contracts the display area of the display portion, or changes AC power use to battery use.

The DTV functional block 14 is configured to control the brightness of the area of a dynamic picture image of the area 101 so as to be higher than the brightness of the other areas. It is possible to lower the brightness of the guide images of the areas 102 to 104 than the dynamic picture image of the area 101. Thus, the visualization of dynamic picture images can be improved. However, for an operation, the brightness of the guide image pointed with a cursor can be controlled so as to be light.

The TV controller 140 of the DTV functional block 14 has a function of storing the monitoring condition list (explained in FIG. 3 to FIG. 5), and sending back the monitoring result to the server 4001. The TV controller 140 also has a function of notifying the server of connection device information and information of the program recorded on the HDD. The TV controller 140 also has a function of registering and storing address data of a mobile device (such as a personal computer and a smartphone) that can perform mutual communication with the DTV 1001, and a function of registering and storing user's individual data (such as gender and nickname). The TV controller 140 also has a function of notifying the server 4001 of the address data of the mobile device and the user's individual data, in response to the request from the server 4001, when the user has performed setting to allow the notification. The user's individual data can include data with a storage term (three days, a week, a month). When the server 4001 has received individual data with a storage term, the server 4001 deletes the stored individual data when the storage term expires.

The following is additional explanation of the details of the direct e-mail request database 4313 (see FIG. 3) in the server 4001.

The direct e-mail request database 4313 includes system announcement (SA) data and marketing announcement (MA) data.

"System Announcement"

System announcement (SA) data is an official message transmitted from the cloud server. The transmission destination thereof is all the devices (DTVs and mobile devices) or part of the devices. The SA data is trouble reports or general advertisements.

<Message Method>

A method of transmitting a message is, for example, a method of transmitting a message to a message box of the DTV as explained with respect to FIG. 12 or FIG. 13. The message may be transmitted to a message box of a mobile device such as a personal computer, a smartphone, and a tablet computer. The message may be transmitted to a mobile device by e-mail.

<Filtering Rules>

When a message is transmitted, the transmission destination (recipient) may be filtered. For example, the following rules * may be adopted as the filtering rules.

*Designate all recipients

... they are designated with all the device IDs, and all the user IDs. All the device IDs includes not only IDs of all the DTVs, but peripheral devices registered in association with the DTVs.

*Designate all device IDs;

*Designate all user IDs;

*Designate specified recipients;

... in this case, the device ID is specified, and the user ID designated by the direct e-mail request control module is used,

*Designate users who satisfy a certain condition;

for example, the certain condition is one or a combination of:

gender;

generation;

Birth month;

DTV model name; and

DTV version.

*Designate device IDs that satisfy a certain condition;

... for example, the certain condition is one or a combination of:

Set area;

Postal code;

DTV model name; and

DTV version.

<In-Box Message Type>

For example, the following three types exist as the system announcement, and can be classified according to the importance:

*Important system message

... This message has contents that all the users should be notified of, such as a report of a system failure, and notice of stopping the server for maintenance. Reception of these notifications cannot be rejected by user settings. In addition, a character string indicating that the announcement is important announcement is added to the head of the subject, such as "important message!". The "transmitter's name" who transmits the important system announcement, "transmitter's image", or "unique icon" is added to the announcement.

*Ordinary system message

... This message has contents that the users should be notified of, in relation to the service, such as a notice of server update, and a notice of a new function. Reception of these notifications cannot be rejected by user settings. The "transmitter's name" who transmits the ordinary system announcement, "transmitter's image", or "unique icon" is added to the announcement.

*Advertisement system message

... This message is a service for ordinary advertisements. The service is provided from the server. The user can perform setting to reject reception of the advertisement system announcement in the DTV.

<Message Parameters>

The following parameters can be set for each of the above message types.

*Important system message parameters:

Specific transmitter;

Recipients ... user IDs, and device IDs;

Service ID ... indicating the type of the important system message;

Service icon ... icon for the important system message;

Short title ... such as "Important" and "Important Notice";

Full (or long) title ... such as simple character string or sentence corresponding to the contents of the message;

Main text ... character string or sentence that specifically describes the contents to be notified;

Sub text ... supplementally described character string or sentence, also including a URL of the website;

Filter type ... indicating the type as the important system message;

Message type ... indicating that the message is an important system message;

Notification date and time ... world standard time;

System message ID ... unique ID assigned to the important system message;

Message data ... data used in a setting menu opened when Button 1 is clicked (pressed), Data used in a guide sentence displayed in the cloud guide picture when Button 2 is clicked (pressed), Data used in a display of a URL of an external website displayed when Button 3 is clicked (pressed) on the DTV, Data used in a display of a URL of an external website displayed when Button 3 is clicked (pressed) on a device other than the DTV, A command to jump to the setting menu is generated when Button 1 is operated, A command to jump to the cloud guide picture is generated when Button 2 is operated, A command to jump to the website is generated when Button 3 is operated;

*Ordinary system message parameters

Specific transmitter;

Recipients ... user IDs, and device IDs;

Service ID ... indicating the type of the ordinary system message;

Service icon ... icon for the ordinary system message;

Short title ... such as "Ordinary" and "Notice";

Full title ... such as a simple character string or sentence corresponding to the contents of the message;

Main text ... character string or sentence that specifically describes the contents to be notified;

Sub text ... supplementally described character string or sentence, also including a URL of the website;

Filter type ... indicating the type as the ordinary system message;

Message type ... indicating that the message is an ordinary system message;

Notification date and time ... world standard time;

System message ID ... unique ID assigned to the ordinary system message;

Message data ... data used in a setting menu opened when Button 1 is clicked (pressed), Data used in a guide sentence displayed in the cloud guide picture when Button 2 is clicked (pressed), Data used in a display of a URL of an external website displayed when Button 3 is clicked (pressed) on the DTV, Data used in a display of a URL of an external website displayed when Button 3 is clicked (pressed) on a device other than the DTV, A command to jump to the setting menu is generated when Button 1 is operated, A command to jump to the cloud guide picture is generated when Button 2 is operated, A command to jump to the website is generated when Button 3 is operated;

*Advertisement system message parameters

Specific transmitter;

Recipients ... user IDs, and device IDs;

Service ID ... indicating the type of the advertisement system message;

Service icon ... icon for the advertisement system message;

Short title ... "Advertisement";

Full title ... such as simple character string or sentence corresponding to the contents of the advertisement;

Main text ... character string or sentence that specifically describes the contents of the advertisement;

Sub text ... supplementally described character string or sentence, also including a URL of the website;

Filter type ... indicating the type as the advertisement system message;

Message type ... indicating that the message is an advertisement system message;

Notification date and time ... world standard time;

System message ID ... unique ID assigned to the advertisement system message;

Message data ... Data used in a display of a URL of an external website displayed when Button 1 is clicked (pressed) on the DTV, Data used in a display of a URL of an external website displayed when Button 1 is clicked (pressed) on a device other than the DTV, A command to jump to the setting menu is generated when Button 1 is operated;

Button ... Button 1 is a button to jump to a website

"Marketing Announcement"

Marketing announcement is an e-mail service for distributing advertisements to users. Generally, these e-mails are referred to as direct e-mails.

The direct e-mails in the present embodiment have a characteristic that advertisements can be directly distributed to users who have viewed a specific program. The basic operation thereof has been explained in FIG. 1 to FIG. 11.

<Message Method>

The message method is, for example, a method of transmitting a message to an in-box in the DTV.

However, a preferable method is a method of transmitting e-mails to target viewers to receive the message. For example, the existing platform may be used when e-mails are transmitted.

<Rules for Filtering Recipients>

<Example 1 of Narrowing Recipients>

When recipients are narrowed down, the following rules can be applied.

*the case where the message is transmitted to all the users ... user IDs registered in the e-mail addresses in the setting menu of the server is used.

*the case where the message is transmitted to specific users . . . user IDs of specific users are designated when target announcement service data is input to the direct e-mail request control module 4312 (see FIG. 3).

*the case where the message is transmitted to users who satisfy certain conditions . . . user IDs of specific users are designated together with some condition data, when target announcement service data is input to the direct e-mail request control module 4312 (see FIG. 3). The condition data may be a combination of some conditions (for example, "female", "20 years old", and "living in the Tokyo area").

The following condition data items may be used in combination as various condition data items:

*Gender;
*Generation . . . 19 years old and below, twenties, thirties, forties, fifties, and 60 years old and above;
*Birth month;
*postal code;
*TV model name; and
*TV firmware version.

As the filtering rule, users who have viewed a specific program may be specified (the specification is executed by using the users' viewing history data or the like).

<Example 1 of Narrowing Recipients>

The following rules can be applied when the recipients are narrowed down:

*The broadcasting time and the channel code of the broadcasting program are set, In this case, a plurality of channels may be set in combination for a broadcasting time. This is because the same program may be broadcast in different broadcasting channel according to the region, In addition, a plurality of rule elements (a plurality of broadcasting times and a plurality of channels) may be combined by logical multiplication (AND) and logical sum (OR), This is because, when the sponsor transmits direct e-mails, the sponsor may transmit direct e-mails to viewers who have viewed both program A and program B, or viewers who have viewed one of program A and program B, The above rules are preferably applied to a live program that is being broadcast.

*A program ID of the program that is being broadcast may be used, in accordance with the situation;

For example, when a serious accident occurs, a special news report for the accident may be broadcast. In such a case, it may be necessary for the server to collect information of the accident from viewers (for example, users close to the scene of the accident) who can report the state of the serious accident. In such a case, the program ID, the region, and the period of the program that is being broadcast may be specified as the rule.

*As other rule elements, an ID of a recommended program and gender identification data may be used.

<E-Mail Format>

*Message text . . . an HTML format is used for describing the message text.

<Management of a Blacklist of E-Mail Addresses>

*There are cases where an e-mail is not normally received by the destination although the e-mail was transmitted. The e-mail distribution processor includes a blacklist manager that manages invalid addresses to manage such a situation. The e-mail address registered in the blacklist manager is automatically erased, when there is no reply from the distribution destination even though the address is used more twice or three times.

"User Interface"
<Interface in DTV>

Figure 16:
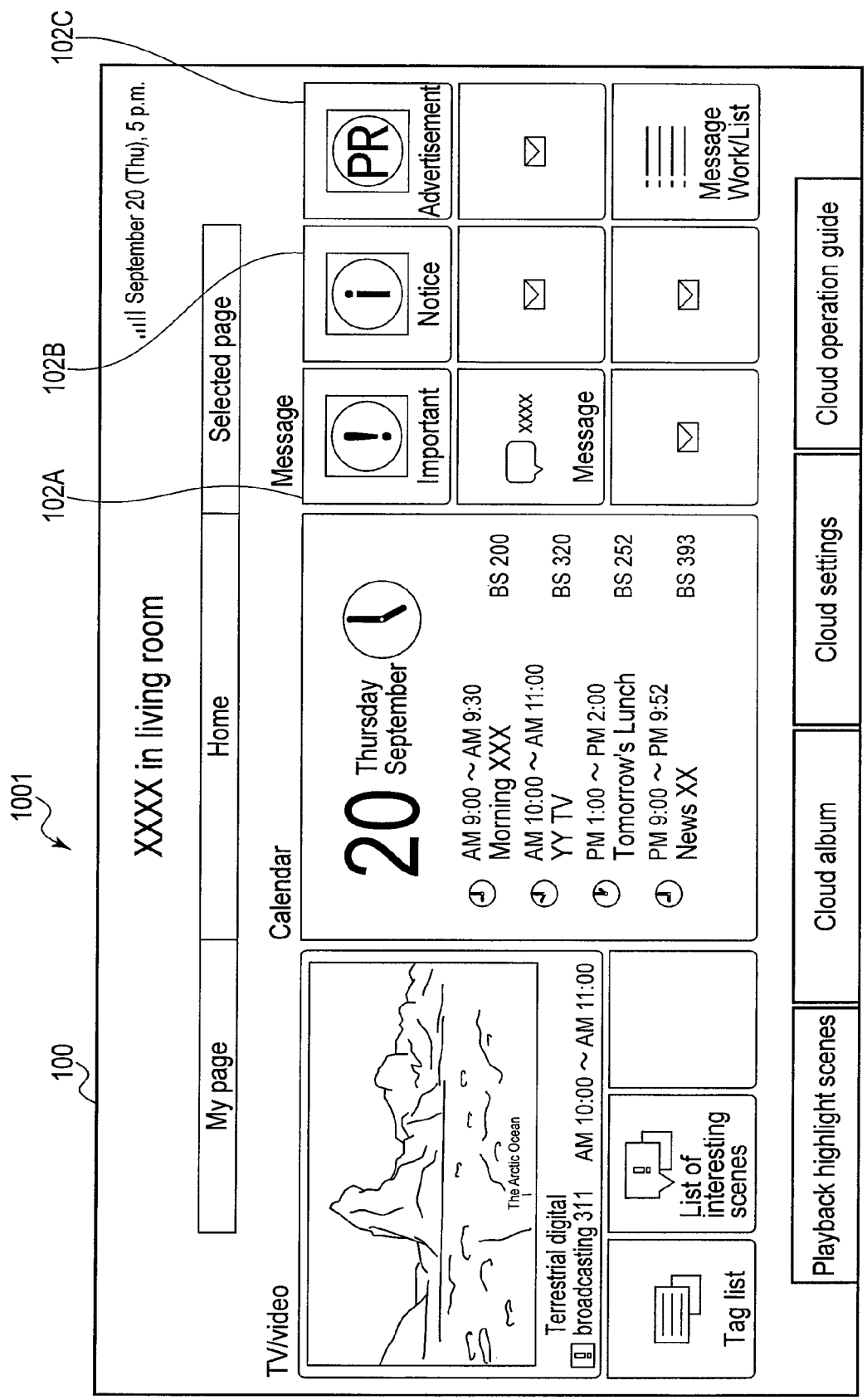
FIG. 16 is a diagram illustrating a configuration example of an information processing apparatus and a DTV functional block and a mutual relationship between them, in the DTV according to the embodiment.

FIG. 16 illustrates an example of representative icons 102A, 102B and 102C displayed when an important system message, an ordinary system message, and an advertisement system message have arrived at the in-boxes displayed in the display region 102 in the screen 100 of the DTV 1001.

FIG. 17 illustrates an example of the picture displayed when an in-box of the "important system message" is opened in the screen 100 of the DTV 1001. In the example, a service icon 102E (a picture of an e-mail), a short title 102F, a transmitter's name 102G, and the main text and sub text 102H are displayed.

In addition, buttons B1, B2, and B3 for performing the next operation are displayed. The button B1 is a button to open the setting menu. The setting menu is, for example, a menu to set whether to allow reception of advertisements or not. It is possible to perform setting to receive advertisements by e-mail instead of the DTV.

The button B2 is a button to open the operation guide of the cloud operation guide (server 4001). The button B3 is a button to open a web site.

FIG. 18 illustrates an example of the screen in the case where the cursor has moved to the position of the button B3 based on an operation of the remote controller. When the user selects the button B3 and presses the enter key, a website relating to the important notice is opened.

Figure 19:
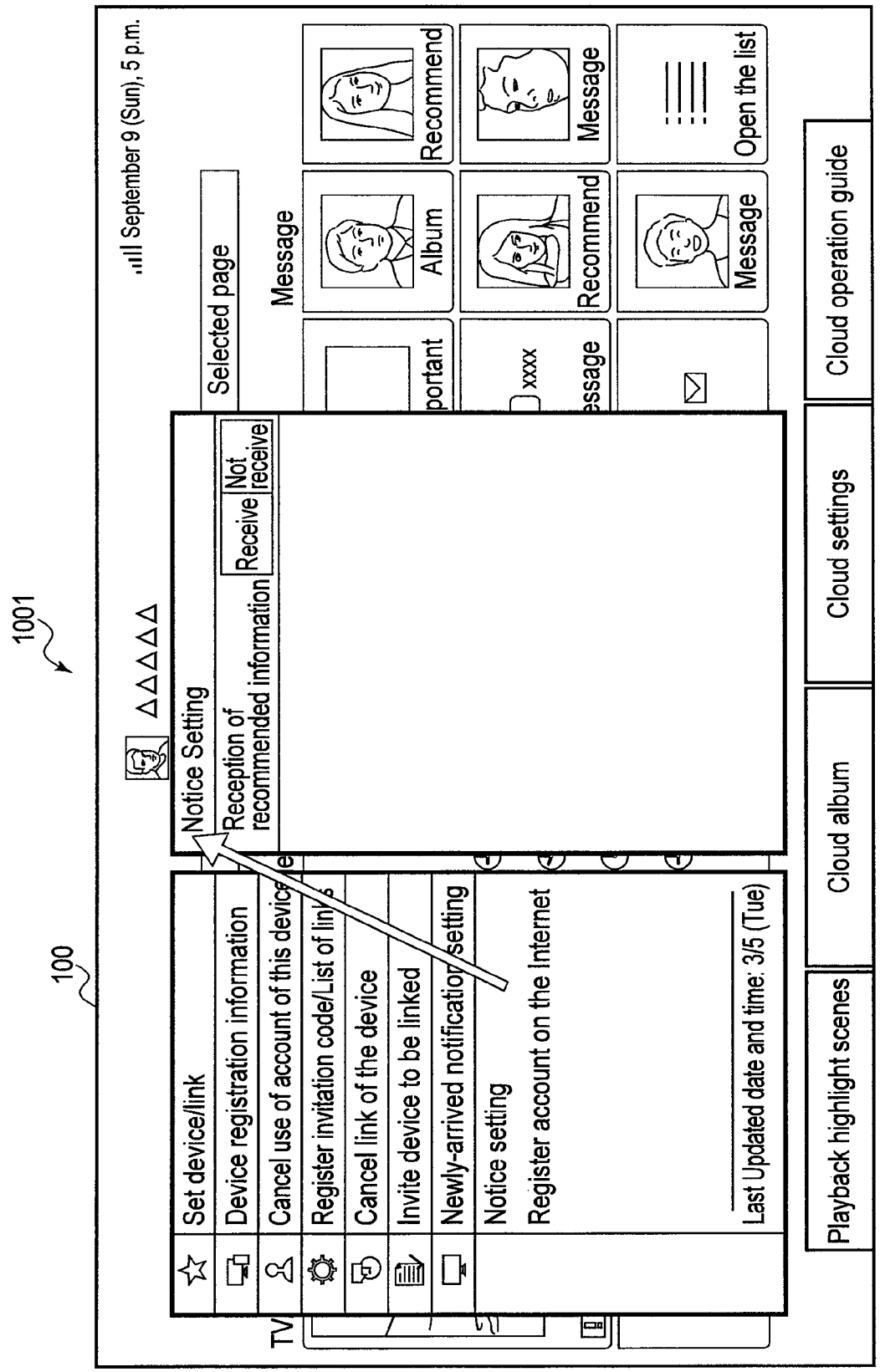
FIG. 19 is a diagram illustrating an example of the screen in the case where the item "notice setting" has been selected and an Enter key has been pressed, in the screen of the DTV according to the embodiment.

FIG. 19 illustrates an example in which the cloud setting button B10 is selected and the enter key is pressed based on an operation of the remote controller, thereafter an item "device/link" is selected from the cloud setting menu (not shown) and the enter key is pressed, and the "device/link" setting menu is displayed. FIG. 19 illustrates an example of the screen in the case where the item "notice setting" is selected and the enter key is pressed.

On the screen in the above state, a button to determine whether to receive "recommended information" or not is displayed in the notice setting menu.

Figure 20:
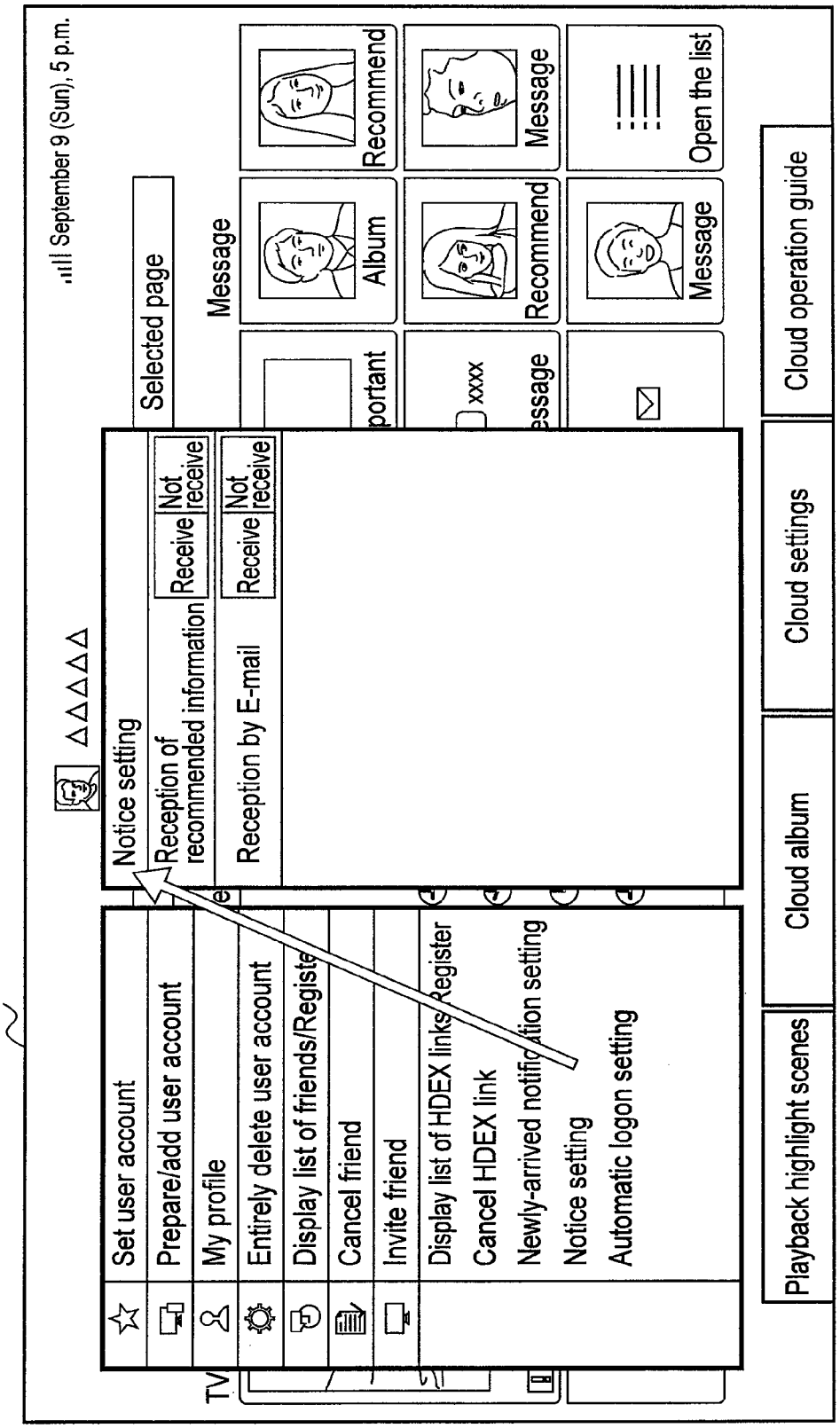
FIG. 20 is a diagram illustrating an example of the screen in the case where another operation has been performed, in the screen of the DTV according to the embodiment.

FIG. 20 illustrates another example. FIG. 20 illustrates an example in which the cloud setting button B10 is selected and the enter key is pressed based on an operation of the remote controller, thereafter an item "account setting" is selected from the cloud setting menu (not shown) and the enter key is pressed, and an account setting menu is displayed.

The account setting menu also includes the item "notice setting". FIG. 20 illustrates an example of the screen in the case where the item "notice setting" is selected and the enter key is pressed.

On the screen in the above state, a button to determine whether to receive "recommended information" or not is displayed in the notice setting menu. In addition, a button to determine whether to receive the information by e-mail or not is displayed on the screen.

Figure 21:
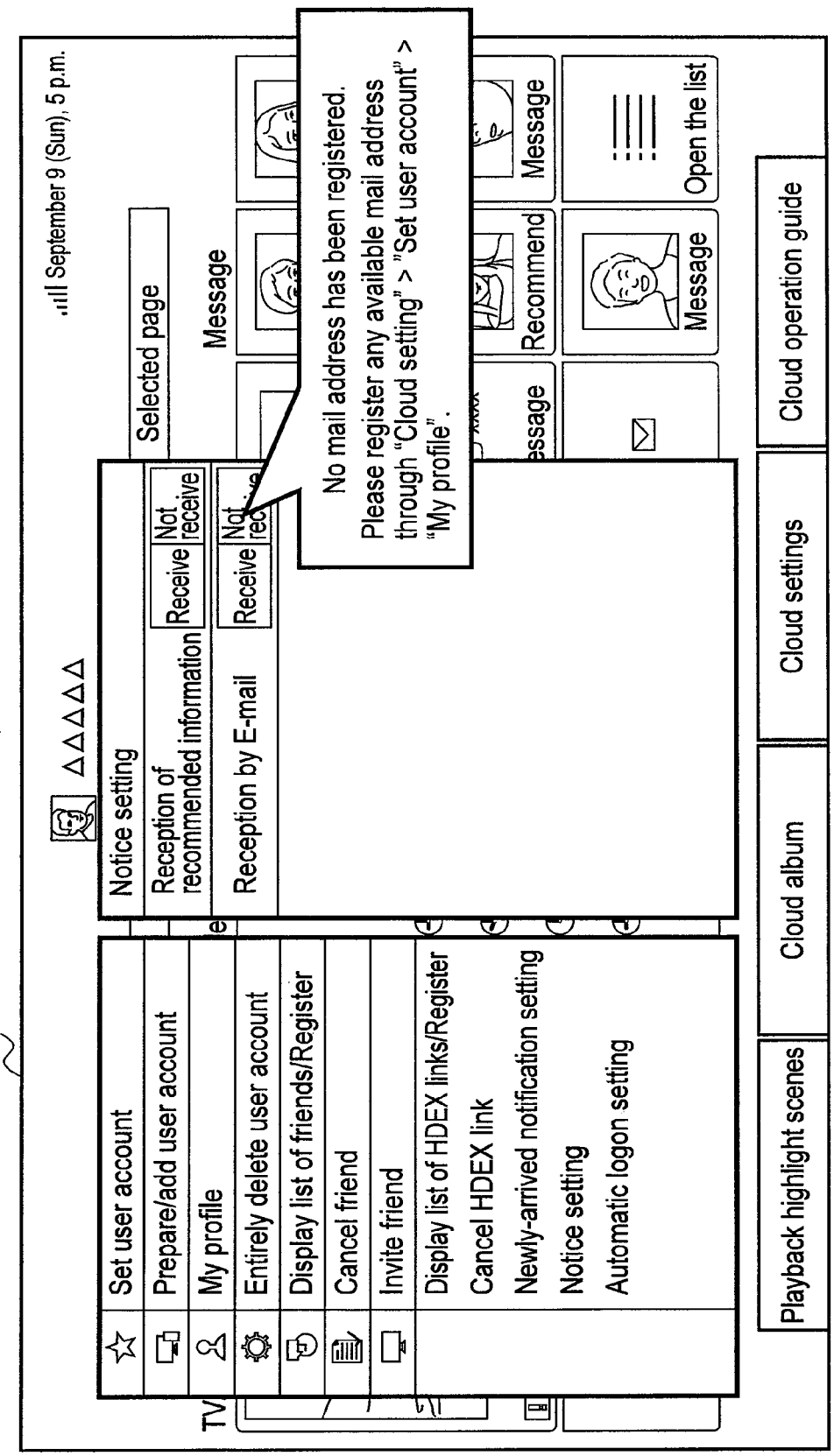
FIG. 21 is a diagram illustrating an example of the screen in the case where a warning message is displayed on the screen of the DTV according to the embodiment.

Suppose that the user has selected receiving "recommended information" by e-mail. When no e-mail addresses are registered in the DTV, a warning message is displayed as illustrated in FIG. 21 (the message pops up). The process for registering an e-mail address is also displayed.

<System Announcement Menu>

Figure 22:
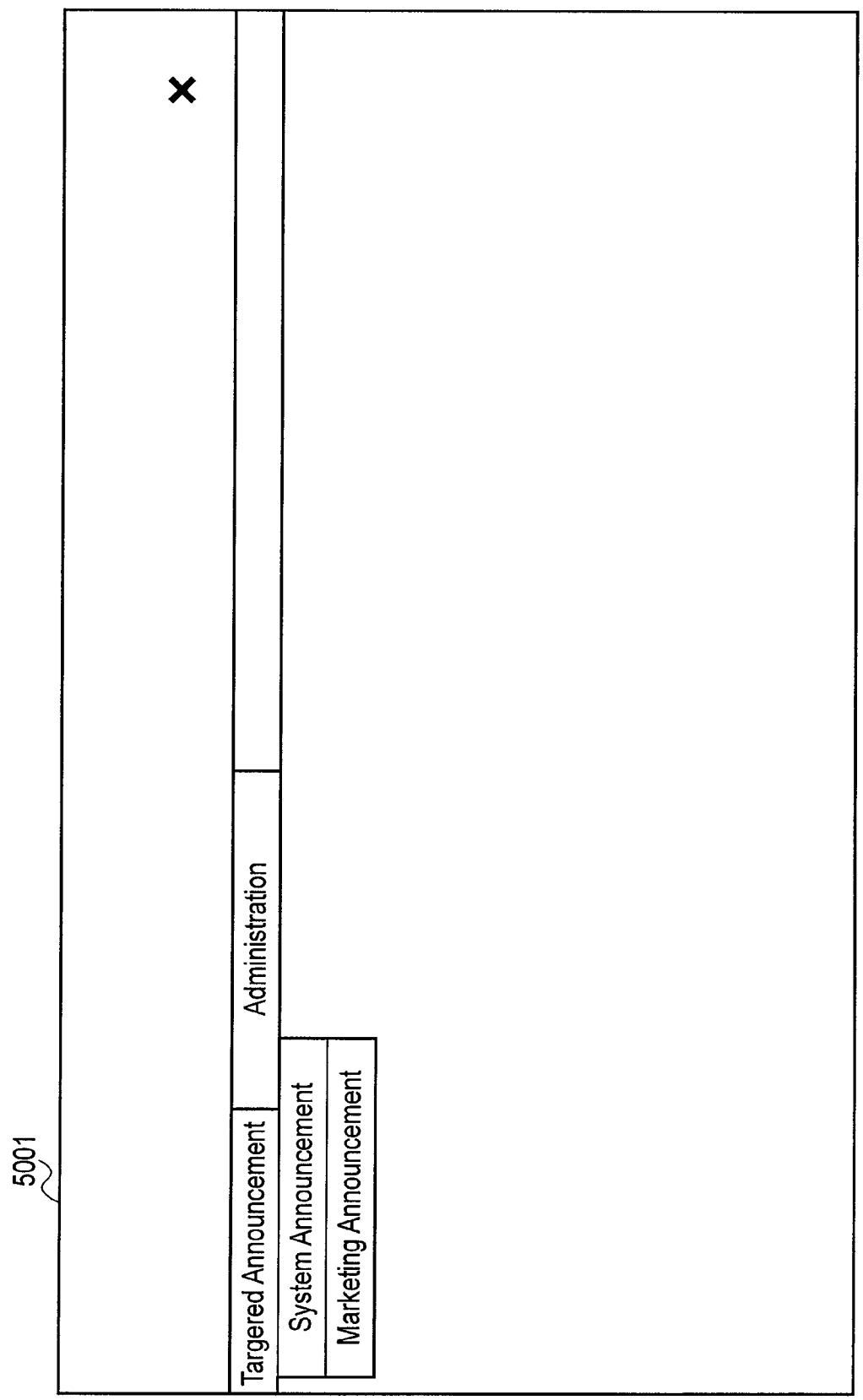
FIG. 22 is a diagram illustrating an example of an interface (picture) displayed when an application of a personal computer of the manager has been started when distribution data or the like is input from the direct e-mail request input module.

FIG. 22 illustrates an example of an interface (picture) 5001 in the case of starting an application used when the user or the message manager directly inputs distribution data from the personal computer to the direct e-mail request input module 4311 (see FIG. 3). The example shows that the title of the system is, for example, "TimeOn".

When the application is started up, the screen displays an item to select which of "System Announcement" and "Marketing Announcement" is to be input.

FIG. 23 illustrates an example of the next picture displayed when "System Announcement" (FIG. 22) is selected. The picture shows a list of system announcements. A plurality of system announcements are prepared, not one system announcement. The list includes items "System Message ID" (1-1), "Long Title" (2-2), "Message Type" (3-3), "Created Date" (4-4), watch buttons 6-6, and delete buttons 7-7.

When a watch button (6-6) is selected and the enter button is pressed, details of the system announcement corresponding to the button are displayed. When a delete button (7-7) is selected and the enter button is selected, the system announcement corresponding to the button is deleted.

When a desired row is selected (highlighted) with the cursor, the filtering (rules) elements are applied to the system announcement of the row (display regions 8-8, and 9-9) are displayed. The example of FIG. 23 shows that the filtering elements of the system announcement of the system message ID (201307270002) include the preparation date (2013-07-27).

When a new system announcement is prepared, a button (10-10) is clicked.

Figure 26:
FIG. 26 is a diagram illustrating another example in which a template is displayed in the case where "System Announcement" is prepared in the personal computer of the manager.

FIG. 24, FIG. 25, and FIG. 26 illustrate an example of displaying templates used in the case where a "System Announcement" is prepared.

The item "(1) system message ID" displays in the picture. The ID is automatically determined by the server. The picture also includes various items and boxes to be filled by the message manager. The boxes include the following boxes:

(2) A box to select a message type, the type includes "important system message", "ordinary system message", and "advertisement system message";

(3) A box to input the short title;

(4) A box to input the full (or long) title;

(5) A box to input the main text;

(6) A box to input the sub text;

(7) A box to input the notification date, in which the world standard time is used;

(8) A box to set a select message (item name) when a menu is selected in the DTV;

(9) A box to set a message used when the user selects a server guide in the DTV;

(10) A box to input a URL used when the viewer checks the guide data using the DTV;

(11) A box to input an URL used when the viewer checks the guide data using a device other than the DTV;

(12) A box to input the conditions for specifying the recipients;

(13) A box to input the device ID and the user ID;

(14) A box to input a condition for specifying the gender of the recipients;

(15) A box to input a condition for specifying the range of generation of the recipients;

(16) A box to input a condition for specifying the birth month(s) of the recipients;

(17) A box to input a condition for specifying a region(s) of the recipients or region(s) where the DTVs are located;

(18) A region to set the sender's name;

(19) A region to set a representative icon prepared by the sender;

(20) A region to write a memo in by the creator, the memo is not transmitted;

(21) A region to display whether the message has been transmitted or not;

(22) A region to display the number of recipients;

(23) A region to display the number of recipients who have read the direct e-mail;

(24) A region to display the number of recipients who have not read the direct e-mail;

(25) An item which is to be checked off when the message has been authorized. If this item is not checked off, the send button is displayed in grey, and the message cannot be transmitted;

(26) A save button to save the current setting state when the button is selected and the enter button is pressed;

(27) A cancel button to cancel the current setting state when the button is selected and the enter button is pressed;

(28) A send button. The current setting state is prepared to be sent and saved, or items "Yes" and "No" are popped up, when the button is selected and the enter button is pressed;

(29) A test button. The message is transmitted to a proper text box of a specific device ID and a user ID when the button is selected and the enter button is pressed. In the test transmission, the filtering function is not operated; and

(30) A box to input the test ID. The creator can directly input a device ID and a user ID as the test ID.

<Marketing Announcement Menu>

FIG. 27 illustrates an example of a next picture displayed after the item "Marketing Announcement" (FIG. 22) is selected. The picture shows a list of marketing announcements. A plurality of marketing announcements are prepared, not one system announcement. The list includes items "Marketing Message ID" (1-1), "Subject" (2-2), "Created Date" (3-3), watch buttons (4-4), and delete buttons (5-5).

When a watch button (4-4) is selected and the enter button is pressed, details of the marketing announcement corresponding to the button are displayed. When a delete button (5-5) is selected and the enter button is selected, the marketing announcement corresponding to the button is deleted.

When a desired row is selected (highlighted) with the cursor, it is displayed what filtering elements are applied to the marketing announcement of the row (display regions 6-6, and 7-7). The example of FIG. 27 shows that the filtering elements of the marketing announcement of the marketing message ID (201307270002) include the preparation date (2013-07-27).

When a new marketing announcement is prepared, a button (8-8) is clicked.

FIG. 28, FIG. 29, and FIG. 30 illustrate an example of displaying templates used in the case where a "Marketing Announcement" is prepared.

The item "(1) system message ID" displays in the picture. The ID is automatically determined by the server. The picture also includes various items and boxes to be filled by the message manager. The boxes include the following boxes:

(2) A box to select a marketing message type, the type includes "E-mail";

(3) A box to input the subject (such as "Important" and "Notice");

(4) A box to input the main text;

(5) A box to input the notification date, in which the world standard time is used;

(6) A box to input users who have viewed specific programs, data for this box may be automatically input;

(7) A box to input the user ID;

(8) A box to input the broadcasting time and the channel code of the program;

(9) A box including the following items (10) to (14);

(10) A box to input the monitoring start time (year [YYYY], month [MM], day [DD], time [hh:mm:ss]);

(11) A box to input the monitoring end time (year [YYYY], month [MM], day [DD], time [hh:mm:ss]);

(12) A box to set broadcasting channels;

(13) A box to set DBS channels;

(14) A box to set DTH channels;

(15) A button used for adding a filtering rule when a marketing announcement is transmitted;

(16) A region to describe the sender's e-mail;

(17) A region to write a memo in by the manager or the sponsor, the memo is not transmitted;

(18) A region to display whether the commercial message has been transmitted or not;

(19) An item which is to be checked off when the message has been authorized. If this item is not checked off, the send button is displayed in grey, and the message cannot be transmitted;

(20) A save button to save the commercial message when the button is selected and the enter button is pressed;

(21) A cancel button to cancel the commercial message when the button is selected and the enter button is pressed;

(22) A send button. The current commercial message is prepared to be sent and saved, or items "Yes" and "No" are popped up, when the button is selected and the enter button is pressed. When the item "Yes" is selected, the current commercial message is transmitted, and the status of item (18) is changed to "Sent". When the item "No" is selected, the commercial message is not transmitted, and the pop-up is closed;

(23) A test button. The message is transmitted to a proper text box of a specific device ID and a user ID when the button is selected and the enter button is pressed. In the test transmission, the filtering function is not operated; and

(30) A box to input the test ID. The creator can directly input an e-mail address as the test ID.

According to the present embodiment, the monitoring condition database 4315 illustrated in FIG. 10 is obtained when result data corresponding to the monitoring condition data is sent as a reply from the viewer who has viewed the predetermined program. In the database, the target program is associated with identification data (ID) of target viewers who have viewed the target program.

<Method for Effectively Expanding the Target Viewers>

The sponsor and the manager may wish to recognize viewers belonging to the same category as the target viewers. In such a case, the target viewer can be expanded by providing the following function. The function enables the server to properly distribute direct e-mails to more users.

Figure 31A:
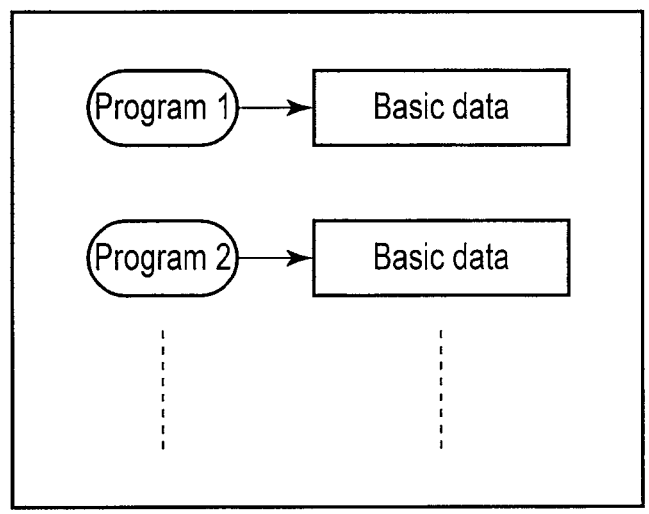
FIG. 31A is a diagram illustrating an example of a data file constructed in the server 4001, showing that basic data exists for a program.

FIG. 31A to FIG. 31D show structural examples of data of various types of data files. FIG. 31A illustrates a file of basic data of each program. FIG. 31A shows that basic data is attached to each program.

There are basic data attached to program 1 and basic data attached to program 2. Basic data is, for example, the data shown in FIG. 32.

FIG. 32 shows an example of basic data of program 1. Program 1 has a program name unique to the program, a broadcasting channel and a broadcasting time slot, etc. Program 1 further includes the information of the host, guests and commercials (sponsors and products) of program 1, etc. The information of the host, guests and commercial might be changed.

Moreover, there is unchanging data related to basic data of program 1. For example, if program 1 is a drama, unchanging data includes the information of the original writer, the director, the screenwriter and the program category.

In addition to the above, the data includes the information indicating whether program 1 on the air is episode 1 or episode 2, and the information of the cast, the scenery (shooting location), the vehicles appearing in the program (vehicle makers), the costumes of the cast (costume makers), the program music and the composer, etc. Further, there is combined basic data generated by combining one of the above basic data with another.

To this data, the information (program identification information) of another program which has the same basic data may be attached.

Figure 31B:
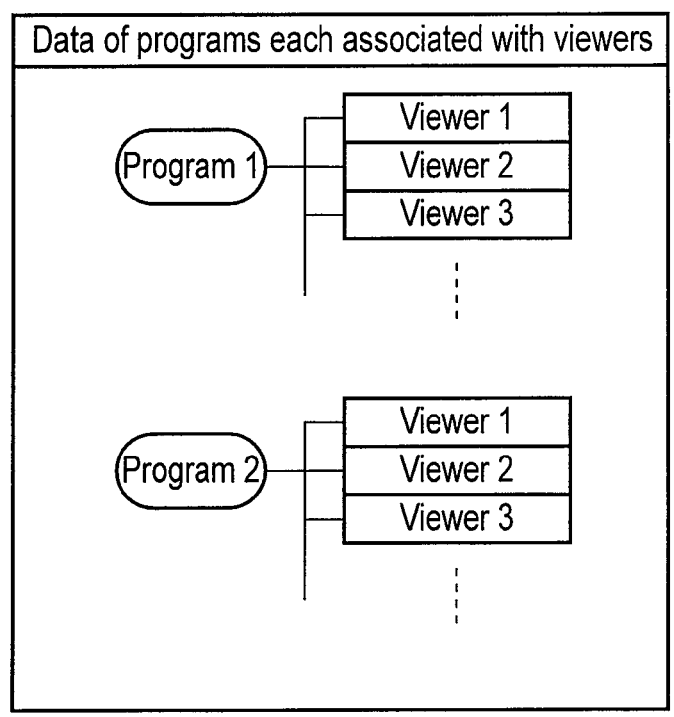
FIG. 31B is a diagram illustrating an example of a data file constructed in the server 4001, showing the relationship between programs and viewers who have viewed the respective programs.

Turning to FIG. 31B, FIG. 31B shows a data file of viewers for each program. A list of viewers 11, 12, 13, . . . who viewed program 1 is constructed. Moreover, a list of viewers 21, 22, 23, . . . who viewed program 2 is constructed.

Figure 31C:
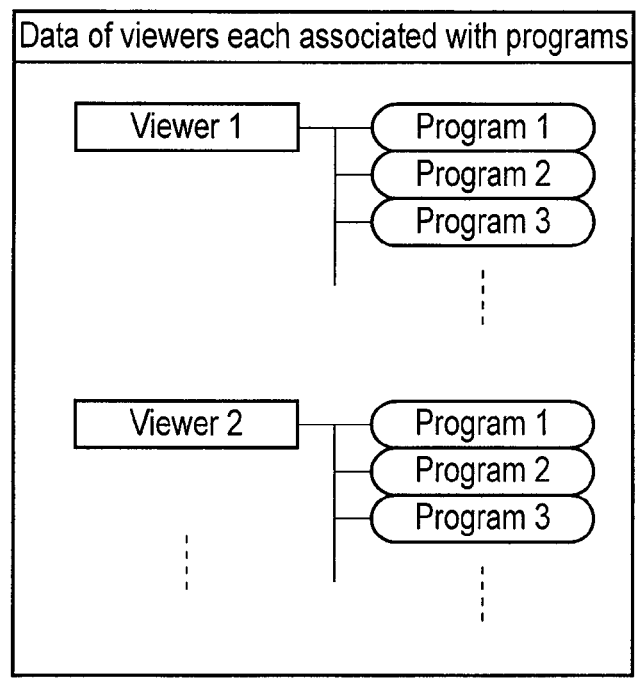
FIG. 31C is a diagram illustrating an example of a data file constructed in the server 4001, showing the relationship between viewers and programs that have been viewed by the respective viewers.

FIG. 31C shows a data file of programs for each viewer. This figure indicates that viewer 1 who viewed programs 11, 12 and 13. The figure also shows that viewer 2 who viewed programs 21, 22 and 23.

Figure 31D:
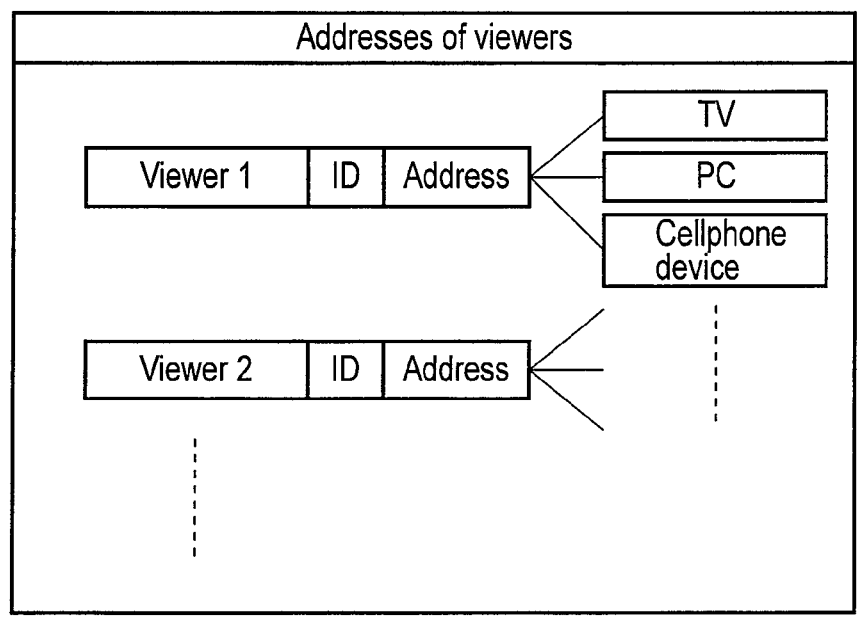
FIG. 31D is a diagram illustrating an example of a data file constructed in the server 4001, showing viewer addresses used by the server when the server communicates with the viewers.

FIG. 31D shows a data file in which the address of each viewer is stored. Each viewer has viewer identification data and an address such as a TV address, a personal computer address and a mobile device address.

FIG. 31A to FIG. 31D and FIG. 32 indicate an example of how to classify and sort out various items of data. However, the classifying and sorting method is not necessarily limited to this system. All files may be integrated into a data file, and among associated data elements, link information may be described in such a way that associated data is linked.

Figure 33:
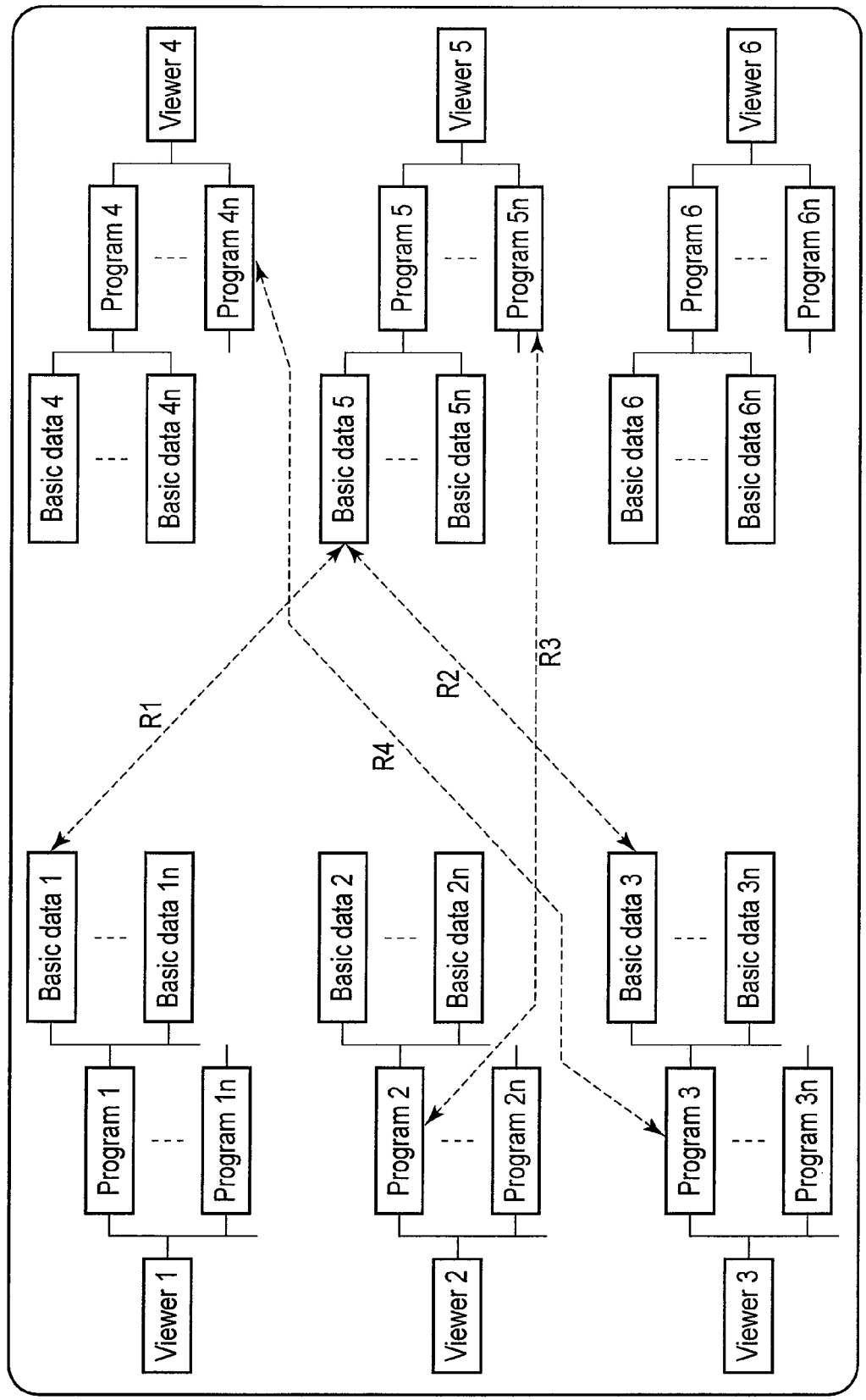
FIG. 33 is a diagram for explaining an example in which programs are associated with viewers and viewers are associated with viewers in the server 4001.

FIG. 33 shows an example of an association route of a case where a viewer is associated with other viewers by the use of the aforementioned data files. Association route R1 shows that a part or all of basic data 1 of program 1 viewed by viewer 1 is the same as a part or all of the basic data of program 5 viewed by viewer 5.

Association route R2 indicates that a part or all of basic data 3 of program 3 viewed by viewer 3 is the same as a part or all of the basic data of program 5 viewed by viewer 5.

Association route R3 shows that program 2 viewed by viewer 2 is the same as program 5n viewed by viewer 5. Association route R4 indicates that program 3 viewed by viewer 3 is the same as program 4n viewed by viewer 4.

These association routes can be searched by an associated data searching device explained later.

FIG. 34 shows an example of a case where programs are associated with each other. Basic data is attached to each program. Therefore, for example, when commercial 1 exists as the basic data of program 1, programs 1, 2, 3 and 4 can be associated with each other. This association state may be referred to as an association state based on the axis of commercial 1, and may be referred to as an association state based on the aspect of commercial 1.

The example of FIG. 34 further shows an association state based on the axis of co-star 2 who appears in program 1. The example shows that co-star 2 in program 1 also appears in programs 2, 3 and 5.

FIG. 34 also shows an association state based on the axis of combination of original writer 1 with category 1. The figure illustrates that original writer 1 is also the writer of programs 1, 11 and 12 and is the writer of programs which belong to category 1.

An association state based on only the axis of category 1 is shown. This example indicates that programs 21 and 22 belong to category 1 in addition to programs 1, 11 and 12. As shown in the example, the original writer of program 21 is different from the original writer of program 22.

Thus, in this system, programs can be associated with each other based on various types of aspects or axes. Therefore, the use of the above database allows us to obtain association states as follows. Taking a program as the starting point, it is possible to obtain an association state of the program with a program based on a different axis and an association state of the program with a viewer.

In a data file of this system, basic data indicating a plurality of attributes related to a program is defined, and basic data of a plurality of programs is stored (FIG. 31A, FIG. 32). The data file includes data of a plurality of programs each associated with viewers (FIG. 31B) and data of a plurality of viewers each associated with programs (FIG. 31D).

In sum, the file controlling logic portion is configured to access at least the data file, generate a data cluster in which data selected depending on a theme is associated, and specify the viewers or programs included in the data cluster.

FIG. 35 shows an example of a data processing block in the server 4001. The data processing block may be provided in the monitoring condition processor 4301 or the main distribution processor 4401, or independently provided in the server 4001.

Receiver controlling logic 4011 receives response data via a network and a receiver. The response data may be the monitoring result explained in FIG. 3, or a reply e-mail from the target viewer who received the direct e-mail.

The output of the receiver controlling logic 4011 is input to a response data analysis engine 4013 within a sequencer 4012. The response data analysis engine 4013 analyzes response data sent from a plurality of viewers based on an analytical program. The analytical program analyzes response data in accordance with procedures which are planned depending on the theme requiring the response data. Response data includes identification information of a viewer who transmitted the response data.

Among a plurality of items of response data, the analytical program extracts response data satisfying the desired conditions in line with the predetermined rules. This response data is referred to as, for example, target response data.

As the predetermined rules, various kinds of rules may be determined depending on the purpose (theme) of data analysis.

A theme is determined based on what sort of things a requester 4020 would like to know or do through the program. A theme may include elements such as "suggestion", "question", "investigation", "questionnaire", "consultation", "comments", "pursuit" and "chase".

The identification information of the viewer who transmitted the target response data (this viewer is referred to as, for example, a target viewer) is used in a theme execution engine 4014.

The target viewer and target response data extracted based on the program process are the viewer and response data in which the requester 4020 is interested.

The theme execution engine 4014 drives an associated data searching device 4034. The associated data searching device 4034 is configured to search various types of items of data within a file 4031 of basic data, a file 4032 of data of a plurality of programs each associated with viewers and a file 4033 of data of a plurality of viewers each associated with programs. The files 4031, 4032 and 4033 are included in the data file 4002.

The associated data searching device 4034 may be referred to as an associated data searching module, searching logic and a searching engine, etc.

The theme execution engine 4014 is configured to:

(A) extract another program viewed by a target viewer through the associated data searching device 4034; and/or (B) extract a new viewer who viewed the above extracted program; and/or (C) extract another program having common data which is partially common to the basic data related to the program viewed by the target viewer, and extract a new viewer who viewed the program having common data.

In the above extraction process, the associated data searching device 4034 uses the data file (database) explained above.

The theme execution engine 4014 executes a theme purpose based on a program (or software) stored in a theme storage 4015. The program stored in the information storage medium of the theme storage 4015 is offered from the requester 4020.

The requester 4020 is, for example, a program sponsor, a program producer, a broadcast station or a company which desires research of various kinds of markets.

The theme execution engine 4014 is configured to further extract a new program and/or a new viewer from the database. The viewer of the extracted new program and the extracted new viewer are viewers whose replies are expected by a requester. In other words, the requester assumes that these viewers may send target response data in reply to inquiry data.

The data of a new program and/or a new viewer is stored in a buffer 4022 in the meantime. Thus, the file controlling logic portion 4003 is configured to generate a cluster in which data is associated depending on a theme among various types of data files and specify the viewers and/or programs included in the cluster.

The address of a viewer is saved in an address storage 4021. Therefore, the theme execution engine controls a compositor (or composition logic) 4023. Based on this control, the theme execution engine generates combined data. The combined data is generated by attaching comments or reinvestigation data, pursuit investigation data and report data, etc., to the address of a viewer who has viewed the extracted program, or the address of the extracted new viewer.

This combined data may be referred to as expandability inquiry data. This expandability inquiry data is transmitted to a transmitter by transmitter controlling logic 4035.

When inquiry data is broadcast again together with a program, the broadcast station is set as a transmission destination. When inquiry data or reinvestigation data, etc., is distributed by a direct e-mail, for example, the data is transmitted to, directly or via the server of the network 3000, a communication device of a target viewer or a new viewer, such as a personal computer, a cellphone, an iPhone and a tablet computer.

In the above explanations, combined data is referred to as expandability inquiry data because of the following reasons.

In this system, response data is analyzed. When inquiry data is distributed again or report data or next inquiry data is distributed based on the analysis result, the data is delivered to a new viewer. For example, to the target viewers of the investigation, a new viewer who is different from the target viewers can be added. For example, as the investigation proceeds in series as the first investigation, the second investigation, the third investigation, . . . associated with each other based on a certain theme, the number of target viewers is not decreased. Therefore, this investigation has a feature of expandability.

Television sets of late models have a time-shift recording function. As the time-shift recording function, for example, all of the programs of the set six channels can be simultaneously recorded in a hard disk for, for example, one to three weeks.

Therefore, when a user reproduces a past program from a hard disk, the previous inquiry data might be displayed as, for example, subtitle data.

A user might respond to the inquiry data in the past program. In response to this kind of case, the cloud server 4001 may performs the following operations.

When response data is received, it is determined whether or not this response data is a real-time response. A real-time response is, for example, a response made during the broadcasting time of the program, or a response made within, for example, an hour from the broadcasting time (the amount of time is not limited).

If response data is not a real-time response, it is possible to determine that the viewer viewed a program of time-shift recording. In this case, it is possible to determine that the viewer is highly interested in the program.

In accordance with the response delay time from the transmission of inquiry data until the reply and reception of response data, target responses (viewers) may be classified. In sum, the viewers who responded in real time are separated from the viewers who responded after they viewed a time-shift recorded program.

Response data is analyzed, and it is determined whether the analysis result has achieved the object.

When the object has not been achieved, the next process is determined in accordance with the theme. In this case, the transmission timing and contents of the next inquiry data, and the program multiplexed with inquiry data may be changed or switched in accordance with the target viewer classified above in accordance with the response delay time.

This is because, for example, there is a possibility that the program viewing time slot of the viewers who responded in real time (real-time responders) is different from the program viewing time slot of the viewers who responded based on a time-shift recorded program (late responders).

The above classification of response delay time or target responses (viewers) may be based on smaller categories. If response data is replied within ten minutes from the real-time broadcasting, the viewer who responded is probably highly interested in the program.

Therefore, according to the present embodiment, when the sponsor (information collector) distributes an e-mail, the sponsor (information collector) can change or select the e-mail transmission time, the contents of the e-mail, and the destinations as desired.

Thus, when a first program is viewed within a first period in a television set, the transmitter (mail distribution module) may transmit a first e-mail including first information relating to the first program. When the first program is viewed in a second period different from the first period in the television set, the transmitter may transmit a second e-mail including second information relating to the first program and being different from the first information.

In the above embodiment, the monitoring condition processor 4301 functions as a receiver 4301 that receives first data that enables recognition that the first program was viewed in the first television set 1001. The e-mail distribution processor 4401 functions as a transmitter 4401 that transmits an e-mail including information relating to the first program and addressed to a first device registered in association with the first television set, using the first data.

In addition, when the receiver 4301 receives the first program and a first condition for the program viewing state of the first television set 1001 was satisfied, the transmitter 4401 can transmit an e-mail including information relating to the first program.

According to another embodiment, when the first program and the second program have been viewed in the first television set 1001, the transmitter 4401 can transmit a first e-mail including information relating to the first program or the second program. When a third program and a fourth program have been viewed in the first television set 1001, the transmitter 4401 can also transmit a second e-mail including information relating to the third program and the fourth program.

According to another embodiment, when the first program is viewed within a first period in the first television set 1001, the transmitter 4401 can transmit a first e-mail including first information relating to the first program. When the first program is viewed within a second period different from the first period in the first television set 1001, the transmitter 4401 can transmit a second e-mail including second information relating to the first program and being different from the first information.

According to another embodiment, addresses of the first devices 1003 to 1005 are addresses registered via the first television set 1001, and the transmitter 4401 can transmit an e-mail including information relating to the first program, when transmission of an e-mail to the first devices is allowed.

According to the above embodiments, functions of the modules in the server 4001 may be executed by a program. As another example, a computer-readable information storage medium recording a code to execute a process by the program may be used.

The technical terms used above in relation to the embodiments and the names or technical terms described in the drawings are in no way restrictive. For example, the processor may be replaced with processing means, a processing unit, or a processing module. Likewise, the controller may be replaced with control means, a control unit, or a control module. The managing unit may be replaced with a manager, managing means, or a managing module. The generator may be replaced with generating means, a generating unit, or a generating module. The storage unit may be replaced with storage means, a storage or a storage module. The collection and correction unit may be replaced with collection and correction means, or a collection and correction device. The registration unit may be replaced with registration means, a registration device, or a registration module.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
   a receiver configured to receive first data indicative of a first program having been viewed via a first television set; and
   a transmitter configured to:
      transmit a message comprising inquiry data relating to the first program to a first device, said first device registered in association with the first television set based on the first data;
      transmit a first message comprising information relating to the first program or a second program, if both the first program and the second program have been viewed via the first television set;
      transmit a second message comprising information relating to a third program or a fourth program, if both the third program and the fourth program have been viewed via the first television set; and transmit a third message comprising first information relating to the first program, if the first program has been viewed in a first period via the first television set, wherein an address of the first device is registered via the first television set and wherein the transmitter is configured to transmit said messages comprising information relating to the first program when transmission of an e-mail to the first device is allowed.

2. The system of claim 1, wherein the transmitter is configured to transmit the inquiry data message comprising information relating to the first program, if a first condition for a program viewing state of the first television set is satisfied, wherein the program viewing state of the first television set is specified by using the first data.

3. The system of claim 1, wherein the transmitter is further configured to transmit a fourth message comprising second information relating to the first program and different from the first information, if the first program has been viewed in a second period different from the first period via the first television set.

4. A data processing method in a server, comprising:

receiving first data indicative of a first program having been viewed via a first television set;

specifying a device registered in association with the first television set based on the first data;

transmitting a message comprising inquiry data relating to the first program to the specified device;

transmitting a first message comprising information relating to the first program or a second program, when it is determined that the first program and the second program have been viewed via the first television set;

transmitting a second message comprising information relating to a third program or a fourth program, when it is determined that the third program and the fourth program have been viewed via the first television set; and transmitting a third message comprising first information relating to the first program, when it is determined that the first program has been viewed in a first period via the first television set, wherein an address of the device is registered via the first television set, and wherein said messages comprising information relating to the first program are transmitted when transmission of an e-mail to the first device is allowed.

5. The method of claim 4, further comprising:

transmitting the inquiry data message comprising information relating to the first program, when the first data has been received and a first condition for a program viewing state of the first television set is satisfied.

6. The method of claim 4, further comprising:

transmitting a fourth message comprising second information relating to the first program and being different from the first information, when it is determined that the first program has been viewed in a second period different from the first period via the first television set.

7. Non-transitory physical computer storage comprising computer-executable instructions that, when executed by a computing system, are configured to:

receive first data indicative of a first program having been viewed via a first television set;

specify a device registered in association with the first television set based on the first data;

transmit a message comprising inquiry data relating to the first program to the specified device;

transmit a first message comprising information relating to the first program or a second program, when it is determined that the first program and the second program have been viewed via the first television set;

transmit a second message comprising information relating to a third program or a fourth program, when it is determined that the third program and the fourth program have been viewed via the first television set; and transmit a third message comprising first information relating to the first program, when it is determined that the first program has been viewed in a first period via the first television set, wherein an address of the device is registered via the first television set and wherein said messages comprising information relating to the first program are transmitted when transmission of an e-mail to the first device is allowed.

8. Non-transitory physical computer storage of claim 7, wherein the computer-executable instructions further comprise:

transmitting the inquiry data message comprising information relating to the first program, when the first data has been received and a first condition for a program viewing state of the first television set is satisfied.

9. Non-transitory physical computer storage of claim 7, wherein the computer-executable instructions further comprise:

transmitting a fourth message comprising second information relating to the first program and being different from the first information, when it is determined that the first program has been viewed in a second period different from the first period via the first television set.

* * * * *